(12) United States Patent  (10) Patent No.: US 11,514,618 B2
Agarwal et al.  (45) Date of Patent: Nov. 29, 2022

(54) GENERATION OF OBJECT HIERARCHIES FOR LOGICAL SELECTION OF GROUPS OF OBJECTS IN VECTOR DESIGNS

(71) Applicant: Adobe Inc., San Jose, CA (US)

(72) Inventors: Vineet Agarwal, Uttar Pradesh (IN); Tarun Beri, Uttar Pradesh (IN); Matthew Fisher, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 210 days.

(21) Appl. No.: 17/091,783

(22) Filed: Nov. 6, 2020

(65) Prior Publication Data

US 2022/0148233 A1  May 12, 2022

(51) Int. Cl.
*G06T 11/00* (2006.01)
*G06K 9/62* (2022.01)

(52) U.S. Cl.
CPC .......... *G06T 11/001* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 6,130,676 A | * | 10/2000 | Wise | G06T 11/60 345/619 |
| 2012/0056900 A1 | * | 3/2012 | Park | G06T 19/20 345/661 |
| 2016/0179798 A1 | * | 6/2016 | Franks | G06F 3/0482 715/739 |
| 2017/0301107 A1 | * | 10/2017 | Sasaki | G06V 10/44 |

OTHER PUBLICATIONS

Zepeda-Mendoza, Marie Lisandra, et al., "Hierarchical Agglomerative Clustering", Encyclopedia of Systems Biology, Springer 2013, 3 pages.
Roux, Maurice, "A Comparative Study of Divisive Hierarchical Clustering Algorithms", Computing Research Repository (CoRR), abs/1506.08977, 2015, 11 pages.
Sharma, Guarav, et al., The CIEDE2000 Color-Difference Formula: Implementation Notes, Supplementary Test Data, and Mathematical Observations:, Color Research and Application, vol. 30, No. 1, Feb. 2005, pp. 21-30.
Sappi Etc, "Defining and Communicating Color: The CIELAB System", Sappi Fine Paper North American, 2013, pp. 1-8.

* cited by examiner

*Primary Examiner* — Tapas Mazumder
(74) *Attorney, Agent, or Firm* — Kilpatrick Townsend & Stockton LLP

(57) ABSTRACT

This disclosure involves applying an edit to objects in a vector design corresponding to a selected level of an object hierarchy. A system accesses a vector design comprising first, second, and third objects, each of the objects having a respective axis coordinate. The system assigns the first object and the second object to or within a common level in an object hierarchy based on determining that a similarity score comparing the two objects exceeds a threshold and that a modification causing the axis coordinates of the two objects to be adjacent maintains an overlap between the third object and the two objects. The system receives a user input selecting the first object and expands the selection to the second object based on the second object being assigned to the common level. The system applies an edit to the first and second objects based on the expansion of the selection.

20 Claims, 7 Drawing Sheets

GENERATION OF OBJECT HIERARCHIES FOR LOGICAL SELECTION OF GROUPS OF OBJECTS IN VECTOR DESIGNS

TECHNICAL FIELD

This disclosure generally relates to facilitating the creation or manipulation of graphic objects. More specifically, but not by way of limitation, this disclosure relates to generating object hierarchies for logical organization and selection of object groups in a vector design, thereby facilitating the editing of object groups in the vector design.

BACKGROUND

Illustration computing systems provide editing tools for creating and editing designs. A set of graphical objects in a design often comprise a single semantic object. In a simple example, a set of shapes (e.g., circles, strokes, and curves) are graphical objects that, viewed together, collectively depict a face of a character. The editing tool could include a function for assigning this set of shapes to the same group, so that the "face" can be selected, moved, and edited as a single unit. Grouping objects in this manner often requires manual selections of individual objects in vector designs. For instance, a user selecting a set of objects comprising a "face" must perform series of clicks to individually select each object.

Furthermore, users may also have to execute a series of clicks to correct an initial selection that includes either more or less objects than the user intended to select. For instance, in an image depicting a tree having multiple branches, a user wishes to edit a single branch of the tree (i.e., only the group of objects forming the branch) and clicks on that branch to select it. But the editing tool's options for selecting the desired group of objects may be limited. For instance, a click on the branch could be interpreted by the editing tool as being a selection of the larger group, such as a selection of the group of objects that form the entire tree, the trunk, all limbs, all branches, and all leaves. Alternatively, a click on a leaf of the branch could be interpreted by the editing tool as being a selection of only a smaller group of objects, such as the objects that form the single leaf. In either of these cases, the user may have to clear the initial selection by clicking elsewhere in the vector design and then re-attempt to make the desired selection. Consequently, a user's attempt to select a desired object or desired group of objects may result in a burdensome user experience.

These issues can be addressed, to some extent, by clustering methods that group similar objects in a design. However, existing clustering methods have limited utility in vector designs that include a set of objects organized into different layers. For instance, an object in a first layer could have a coordinate identifying the object's position on a z-axis, and an object in a second layer could have a coordinate identifying a different position on the z-axis. Existing clustering methods fail to consider positions of objects along a z-axis relative to other objects, which could result in a distortion of a visual appearance of the vector design with respect to objects perspective (e.g. as a result of clustering, an first object that was originally occluded by a second object occludes the second object).

SUMMARY

Certain embodiments involve generating, for a vector design, an object hierarchy and interpreting a selection of objects in the vector design accordance with the object hierarchy. For example, a clustering engine accesses a vector design comprising a first object at a first coordinate along an axis, a second object at a second coordinate along the axis, and a third object at a third coordinate along the axis. The clustering engine assigns, using a clustering algorithm, the first object and the second object to or within a common level in an object hierarchy based on determining that: a similarity score comparing the first object and the second object exceeds a threshold similarity score, wherein the similarity score is determined based on attributes of the first and second objects comprising one or more of color parameters, stroke parameters, size parameters, shape parameters, and spatial placement parameters, and a modification causing the first coordinate and the second coordinate to be adjacent along the axis maintains an overlap between the third object and one or more of the first object and the second object. The clustering engine receives a user input causing a selection of the first object. The clustering engine expands the selection to the second object based on the second object being assigned to the common level in the object hierarchy. The clustering engine applies an edit to the first object and the second object based on the selection being expanded to the second object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
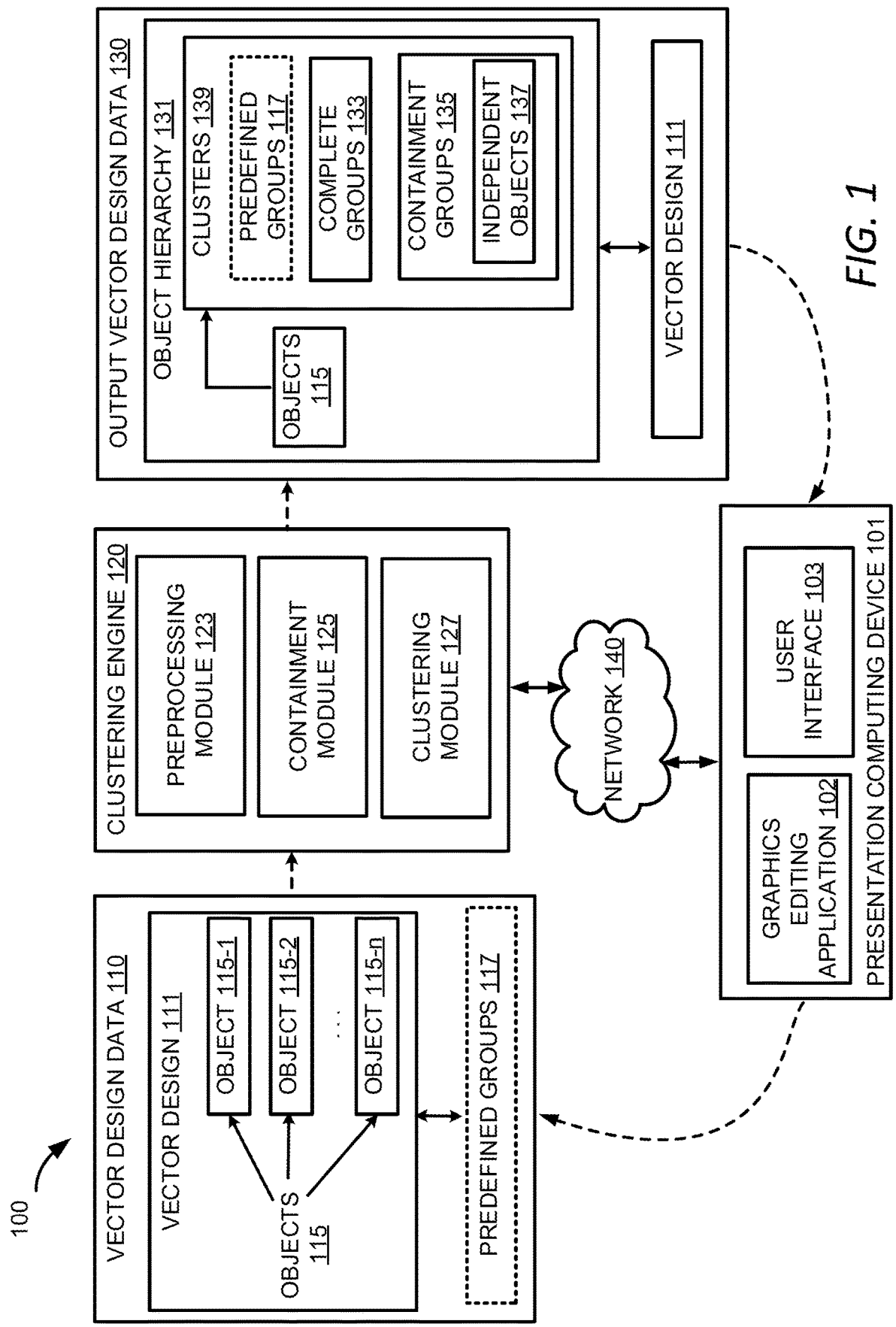
FIG. 1 depicts an example of a computing environment for generating for a vector design, an object hierarchy and interpreting a selection of objects in the vector design accordance with the object hierarchy, according to certain embodiments described in the present disclosure.

The present disclosure involves generating object hierarchies for logical selection of object groups in a vector design, thereby facilitating the editing of object groups in the vector design. As explained above, conventional editing tools provided by illustrator systems allow users to manually define groups of objects and to select groups of objects that have been manually grouped. However, this type of object grouping results in users having to engage in burdensome maneuvers both to create groups of objects and to select a desired object or a desired group of objects in a vector design that includes manually-grouped objects, thereby degrading the functionality of the editing tool. Certain embodiments described herein can avoid one or more of these problems by, for example, automatically generating an object hierarchy from objects in a vector design using a clustering algorithm that considers z-coordinate information of objects and boundaries of objects with respect to boundaries of other objects. These embodiments can improve the functionality of graphics editing tools by increasing the efficiency with which a user can select a particular set of objects in a vector design for editing or other manipulation.

The following non-limiting example is provided to introduce certain embodiments. In this example, a graphics editing tool accesses a vector design. In the vector design, objects are positioned in different layers along a z-axis, where a given object's z-coordinate identifies the layer in which object is positioned. For instance, in a vector design of a tree that includes component objects of the tree (e.g. a trunk, branches, leaves) and a sky, a z-coordinate of the sky is different than z-coordinates of the component objects of the tree to position the sky as the background of the vector design. The z-coordinates indicate that, for example, a branch of the tree is in a background relative to another branch of the tree but both branches are in the foreground relative to the sky.

The graphics editing tool assigns the objects from the accessed vector design into an object hierarchy having multiple levels using a clustering algorithm. For instance, for the vector design of the tree, the graphics editing tool assigns an individual leaf to a first level of the object hierarchy, a group of leaves (including the individual leaf) that are attached to a branch to a second level of the object hierarchy, the branch and the group of leaves to a third level of the object hierarchy, and the whole tree including the branch that includes the group of leaves to a fourth level of the object hierarchy. In addition to or instead of these levels in the object hierarchy, the graphics editing tool could assign the individual leaf to a primary level, a group of all leaves that are attached to a branch that the individual leaf is connected to (including the individual leaf) to a secondary level, and all leaves in the vector design attached to the tree to a tertiary level.

In this example, building this object hierarchy with the clustering algorithm involves building lower levels of the object hierarchy by clustering similar individual objects into groups. The clustering algorithm further involves clustering groups with other individual objects and other groups to form larger groups of objects in higher levels of the object hierarchy.

To cluster objects into groups to generate levels of the object hierarchy, the graphics editing tool determines pairwise similarity scores that compare objects. The graphics editing tool determines a pairwise similarity score between two objects by considering similarity across various parameters including color parameters (e.g. color space values of a fill color), stroke parameters (e.g. stroke width, stroke color, line join, line cap, dash array), size parameters (e.g. an area), shape parameters, and spatial placement parameters (e.g. a shortest distance between objects). The graphics editing tool groups the two objects together if the pairwise similarity score is above a predefined threshold. For example, continuing with the vector design of the tree discussed previously, the graphics editing tool may determine that two branch objects of the tree should be grouped together because the branch objects are similar among one or more of these parameters (e.g. the two branch objects are spatially proximate, have a similar shape, and a similar fill color value), resulting in a pairwise similarity score that is greater than the predefined threshold similarity score. In this example, the group of the two objects could then be grouped with another branch, and so forth, generating higher levels of the object hierarchy.

Continuing with this example, the graphics editing tools create a new level in the object hierarchy by grouping two objects in adjacent z-coordinate positions. For instance, the graphics editing tool moves objects not having adjacent z-coordinate positions into adjacent z-coordinate positions to facilitate grouping the objects. The graphics editing tool uses a clustering algorithm that does not group two objects if grouping the objects would result in the two objects not maintaining an overlap of both of the objects with respect to a third object, even if the two objects have a pairwise similarity score greater than the predefined threshold similarity score.

In a simplified example involving the vector design of a tree, a first branch's z-coordinate is $z=1$, a sun object's z-coordinate is $z=5$, a second branch's z-coordinate is $z=10$. The second branch overlaps the sun object. The graphics editing tool determines whether the second branch could be moved backward along the z-axis (e.g., by decreasing the z-coordinate value from 10) or the first branch could be moved forward along the z-axis (e.g., by increasing the z-coordinate value above 1) while maintaining an overlap of the second branch with respect to the sun object. In this simplified example, changing the first branch's z-coordinate to $z=6$ and the second branch's z-coordinate to $z=7$ places the first and second branches in adjacent layers (e.g., $z=6, 7$) while maintaining the overlap between the second branch and the sun, since the sun object's z-coordinate ($z=5$) is less than the second branch's modified z-coordinate ($z=7$). However, if moving the second branch to a layer adjacent to the layer of the first branch would cause the second branch object not to overlap the sun object, the graphics editing tool does not group the branch objects. For instance, if moving the second branch to a layer adjacent to the layer of the first branch would, due to other design constraints, require decreasing the second branch's z-coordinate to $z=4$, then the sun object's z-coordinate ($z=5$) would be greater than the second branch's modified z-coordinate ($z=4$). Since this movement would remove the overlap between the second branch and the sun, the graphics editing tool would not group the first and second branches together.

The graphics editing tool device uses the object hierarchy constructed for the vector design to facilitate editing multiple group of objects in the vector design. For example, continuing with the vector design of the tree, the graphics editing tool receives a selection of a branch of the tree in the vector design. The graphics editing tool determines that the first and second branches are assigned to a first level in the object hierarchy. In response to this determination, the graphics editing tool expands the selection to the second branch in addition to the first branch. For instance, the vector design is displayed on a user computing device and the graphics editing tool detects a selection (e.g. a click, tap, or other input) via the user interface at a location within boundaries of the first branch, retrieves the object hierarchy constructed for the vector design, identifies the first level in the object hierarchy that includes both the first and the second branches, and expands the selection of the first branch to include the second branch.

In some embodiments, the graphics editing tool receives an input selecting an object along with inputs indicating a navigation along levels of the object hierarchy that include the selected object. For instance, continuing with the vector design of the tree, the user may use a first type of input (e.g. a mouse click, a first touchscreen gesture) to select the first branch in the vector design and a second type of input (e.g. rolling a mouse wheel, a second touchscreen gesture) to indicate a level of the object hierarchy to refine the selection so that the selection is expanded (or contracted) to encompass a larger (or smaller) group of objects. In this example, a user clicks the first branch in the vector design and then rolls a mouse wheel to navigate to a higher level on the object hierarchy than a current level to expand a selection. For instance, the graphics editing tool could receive the selection and a navigation from the first level in the object hierarchy (that includes the expanded selection that includes the first and second branches) to a second level within the object hierarchy that includes all branches of the tree. Accordingly, the graphics editing tool further expands the selection of the first and second branches of tree to include all branches of the tree. In another instance, the graphics editing tool receives a first input including a selection of the first branch in the vector design of the tree and a second input indicating a navigation from the first level in the object hierarchy (that includes the expanded selection of the second branch) to an object level within the object hierarchy specifying only the first branch. Accordingly, in this other instance, the graphics editing tool contracts the expanded selection of the first and second branches of tree to include only the first branch of the tree.

The graphics editing tool applies edits to a selected group of objects specified by a level in the object hierarchy. For example, users can select groups of objects and rotate, move, resize, apply shading or color, delete, duplicate, copy, change a coordinate on the z-axis, or apply other edits to the selected group of objects.

Certain embodiments provide improvements to computing systems by lessening a burden of navigation of user interfaces. Examples of burdensome user interface navigation include excessive clicking (1) to select a desired object or desired group of objects in vector designs and (2) selecting an undesired object or group of objects and attempting to change the selection to include more or less objects than the initial selection. Improvements that reduce this burdensome user interface navigation can be effected by generating an object hierarchy for a vector design using a clustering algorithm as described herein, and using this object hierarchy data structure as a logical framework for interpreting which objects are included in a selection in the vector design. For instance, the clustering algorithm allows a computing system to assess similarity between objects and groups of objects in a vector design to one another and to control, based on the assessed similarity, the structure of the object hierarchy for defining and refining a selection of objects. Controlling the configuration of an object hierarchy or other user interface tool in this manner improves the functionality of the interface by, for example, reducing the amount of navigation required by the user interface of a vector graphics application. These techniques, therefore, decrease an amount of time or effort a user spends on selecting a desired object or desired group of objects or on correcting a selection of object(s) that the user intended to encompass more or less objects than an initial interpretation of the selection.

Further, certain embodiments provide improvements to computing systems by improving methods of hierarchical clustering that would otherwise result in illogical clustering in the context of vector designs. An example of illogical clustering is clustering that does not consider z-coordinate information of objects and therefore results in a visual alteration of the vector design. Such a grouping of objects is not useful to an ordinary user desiring to select groups of objects to edit in the vector design. Improvements that reduce this illogical clustering include only clustering items having z-coordinate values that can be shifted to an adjacent position while maintaining an overlap with a third object. Another example of illogical clustering includes clustering a first item that has boundaries that are contained within boundaries of a second item with a third item having boundaries outside of the boundaries of the second item. For instance, in a vector design that depicts a calculator that includes a calculator base and black keys in proximity to a black pencil, it would be illogical to cluster one of the calculator keys with the pencil, even though the key object and the pencil object may have similarities (e.g. both are the same color) that would otherwise result in clustering. The clustering of a calculator key object with the pencil object may not be a useful grouping for an ordinary user desiring to apply edits in a vector design to groups of objects. Improvements that reduce this illogical clustering can be effected by through a clustering algorithm that identifies containment groups (e.g. objects or group within an object), generates a priority queue for the clustering algorithm as described herein so that pairs of items including one item within a containment group and another item outside of the containment group are not included in the priority queue and are therefore not clustered using the clustering algorithm.

These techniques not only improve the functioning of user interfaces and enable an effective use of clustering algorithms in the context of vector designs but also decrease an amount of time or effort a user spends on grouping objects in a vector design. The impracticality of manual grouping increases as a number of objects in a vector design increases. Instead of a user manually defining objects to group, the techniques described herein automatically and logically group objects into an object hierarchy.

Example of an Operating Environment for Constructing an Object Hierarchy for a Vector Design using a Clustering Algorithm Referring now to the drawings, FIG. 1 depicts an example of a computing environment 100 for generating for a vector design an object hierarchy and interpreting a selection of objects in the vector design accordance with the object hierarchy. In this example, the computing environment 100 includes a clustering engine 120 and a presentation computing device 101, where the clustering engine 120 accesses vector design data 110 that includes a vector design 111 and generates output vector design data 130 including an object hierarchy 131 for the vector design 111. The clustering engine 120 executes one or more software modules that support creation of object hierarchies from vector designs 111.

In the example depicted in FIG. 1, the clustering engine 120 accesses vector design data 110 including a vector design 111. The vector design 111 is an artwork that includes n objects 115-1, 115-2 . . . 115-n. In some embodiments, the clustering engine 120 receives the vector design 111, which is created by one or more users. The vector design 111 can include objects 115 created by users via graphics editing applications 102 or pre-created objects 115 retrieved from a database. Creating the vector design 111 can involve placing the objects 115 in the vector design 111, arranging the objects 115, defining a position on an axis (for example, a z-coordinate position), apply one or more edits to objects 115, and/or other action to create the vector design 111. In some embodiments, the accessed vector design data 110 includes predefined groups 117 data for the vector design 111. For instance, vector design data 110 includes information indicating predefined groups 117 of n objects 115 of the vector design 111 that are defined by users via selection of the n objects. In some embodiments, the accessed vector design data 110 does not include predefined groups 117 data for the vector design 111.

As shown in FIG. 1, the clustering engine 120 determines, from the vector design data 110, output vector design data 130 including an object hierarchy 131 for the vector design 111. The object hierarchy 131 is a logical, hierarchical organization of groups of objects 115 in the vector design 111 that is generated using a clustering algorithm. The object hierarchy 131 includes multiple levels corresponding to clusters 139 of objects 115 or groups (e.g. complete groups 133, containment groups 135 including independent objects 137, predefined groups 117) generated using the clustering algorithm. Clusters 139 are formed from one or more of objects 115, groups, or previously-generated clusters 139. Generation of the object hierarchy via the clustering algorithm is described in further detail below with respect to FIGS. 3 and 4.

In some embodiments, the clustering engine 120 generates the output vector design data 130 including the object hierarchy 131 for the vector design 111 using a preprocessing module 123, a containment module 125, and a clustering module 127. The preprocessing module 123 identifies any predefined groups 117 from the vector design data 110. The preprocessing module 123 identifies a coordinate position (e.g. a z-coordinate position, an x-coordinate position, a y-coordinate position) of the objects 115 and any predefined groups 117 in the vector design 111. The preprocessing module 123 identifies in the vector design 111 complete groups of objects, which are groups of objects that are duplicates and/or objects that are duplicates except for affine transformation (e.g. rotation, resizing, translation). The containment module 125 generates containment groups 135 of independent objects 137, where a containment group 135 is defined by an object having an outer boundary that contains one or more independent objects 137. The clustering module 127 generates the object hierarchy 131 using a clustering algorithm, which considers the coordinate position along an axis determined by the preprocessing system when clustering items (including objects 115 and groups of objects 115). The clustering algorithm includes rules for generating the object hierarchy 131 that also consider designations of groups and objects determined by the preprocessing module 123, the containment module 125, and the clustering module 127. For instance, designations of objects 115 and groups of objects 115 include a complete group 133 designation, a containment group 135 designation, an independent object 137 designation, a predefined group 117 designation, a cluster 139 designation, and an object 115 designation. The generation of the object hierarchy 131 using the clustering algorithm is described in further detail below with respect to FIGS. 3 and 4.

As shown in FIG. 1, the clustering engine 120 communicates with the presentation computing device 101 via the network 140. In other embodiments, the clustering engine 120 operates on the presentation computing device 101 and communicates with the graphics editing application 102 on the presentation computing device. In some embodiments, the clustering engine 120 receives the vector design data 110 from the presentation computing device 101 and provides the output vector design data 130 including the object hierarchy 131 generated for the vector design 111 to the presentation computing device 101.

The presentation computing device 101 includes a graphics editing application 102 and a user interface 103. The graphics editing application 102 is used to create (or retrieve), edit, and/or publish vector designs 111. The graphics editing application 102 communicates with the clustering engine 120 and is downloadable onto a presentation computing device 101 or accessible via the network 140 using a web browser application of the presentation computing device 101.

The user interface 103 displays a vector design 111, which is editable via input of one or more users via the user interface 103 of the presentation computing device 101. The graphics editing application 102 detects, via the user interface 103, inputs including selections of objects 115 and/or groups of objects 115 in the vector design 111 and selection of options to apply edits to the selected objects 115 and/or groups of objects. In embodiments described herein, the graphics editing application receives a selection, which is input by a user, in the vector design 111 and the graphics editing application 102 refines the selection according to a level of the object hierarchy 131 generated for the vector design 111 by the clustering engine 120. For instance, in some examples, the graphics editing application 102 detects a selection of an object, which is input by a user via the user interface 103, and the graphics editing application 102 expands the selection to encompass other objects 115 found along with the selected object 115 in a level of the object hierarchy 131. In some examples, the graphics editing application 102 detects a selection, which is input by the user, of an object 115 via the user interface 103 and an input specifying a level of the object hierarchy 131. For instance, the graphics editing application 102 displays, via the user interface 103, the object hierarchy 131 (e.g. via a contextual menu) in response to detecting a selection of an object 115 in the vector design 111 and detects further inputs to navigate the object hierarchy 131 to refine the selection to encompass a desired group of objects 115 that includes the selected object 115. Examples of an interpretation of a selection of objects 115 in the vector design 111 using the object hierarchy 131 is described in further detail below with respect to FIG. 6.

In the examples described herein, the presentation computing device 101 is separate from the clustering engine 120. However, in some embodiments, the presentation computing device 101 is a component or subsystem of the clustering engine 120, the clustering engine 120 is a component or subsystem of the presentation computing device 101, or the functions of both the presentation computing device 101 and the clustering engine 120 are performed by a combined device or system. In some embodiments, the clustering engine 120 performs one or more the functions of graphics editing application 102 and/or presentation computing device 101 described in the examples above. In some embodiments, the presentation computing device 101 performs one or more functions of the clustering engine 120 described in the examples above.

One or more of the clustering engine 120 and the presentation computing device 101 include a device having a communication module capable of transmitting and receiving data over a data network 140. For instance, one or more of the clustering engine 120 and the presentation computing device 101 include a server, a desktop computer, a laptop computer, a tablet computer, a television with one or more processors embedded therein and/or coupled thereto, a smart phone, a hand-held computer, or any other wired or wireless, processor-driven device. Examples of the data network 140 include, but are not limited to, internet, local area network ("LAN"), wireless area network, wired area network, wide area network, and the like. The data network 140 includes a wired or wireless telecommunication means by which network systems communicate and exchange data. For example, each data network is implemented as, or is a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an internet, a mobile telephone network, a card network, a Bluetooth network, a Bluetooth low energy ("BLE") network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that exists in a computer-based environment.

Figure 2:
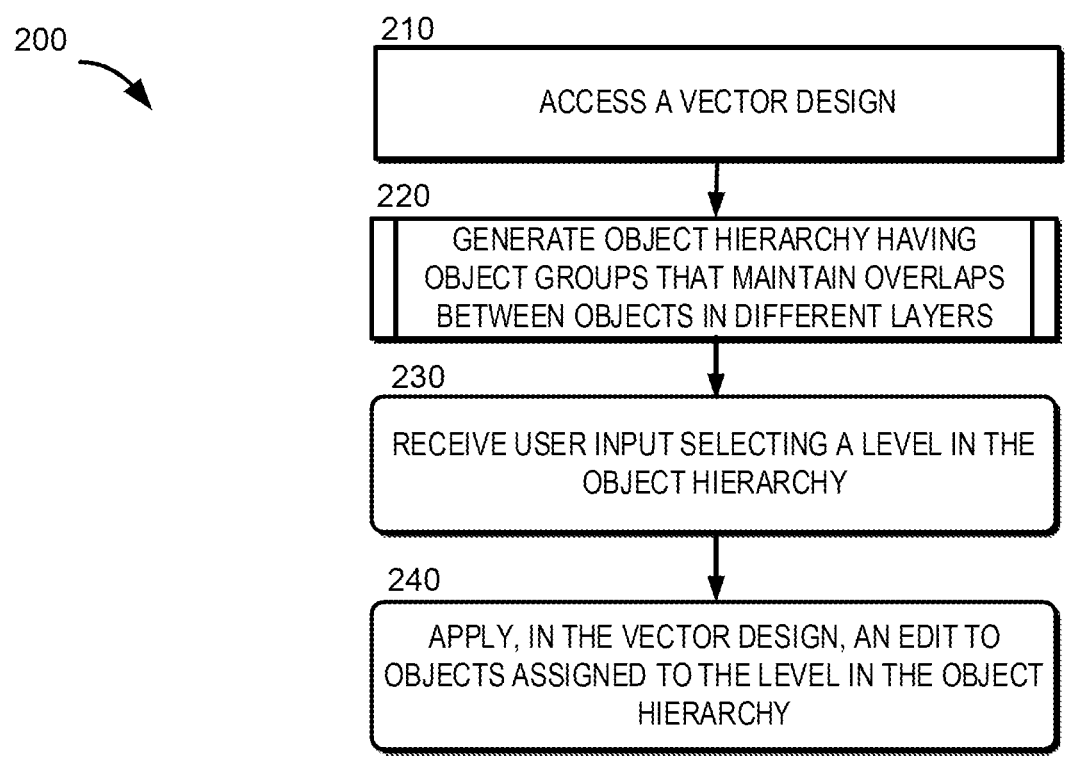
FIG. 2 depicts an example of a method for generating for a vector design, an object hierarchy and interpreting a selection of objects in the vector design accordance with the object hierarchy, according to certain embodiments described in the present disclosure.

Examples of Operations for Constructing an Object Hierarchy for a Vector Design using a Clustering Algorithm FIG. 2 depicts an example of a method 200 for generating, for a vector design 111, an object hierarchy 131 and interpreting a selection of objects 115 in the vector design 111 accordance with the object hierarchy 131, according to certain embodiments. For illustrative purposes, the method 200 is described with reference to the components illustrated in FIG. 1, although other implementations are possible. For example, the program code for the clustering engine 120, which is stored in a non-transitory computer-readable medium, is executed by one or more processing devices to cause the clustering engine 120 to perform one or more operations described herein.

At block 210, the method 200 involves the clustering engine 120 accessing a vector design 111. In an example, the clustering engine 120 is associated with a vector graphics service. For instance, the vector graphics service provides a graphics editing application 102 for download on a presentation computing device 101 that includes tools for creation or editing of the vector design 111. The clustering engine 120 receives vector design data 110 including the vector design 111 from the graphics editing application 102 or accesses the vector design data 110 from a database, for example, a database of the vector graphics service.

The vector design 111 includes multiple objects 115. Objects 115 in the vector design 111 are created by users and/or imported to the vector design 111 from a database of the vector graphics service. Objects 115 include vector graphics, which are graphics which are defined by points connected by curves to form shapes. Examples of vector graphics that are imported into a vector design 111 include Scalable Vector Graphics ("SVG"), Encapsulated PostScript ("EPS"), and Portable Document Format ("PDF") files. In some embodiments, objects 115 also include raster graphics such as images. The objects 115 in the vector design 111 include dimensional coordinate information that defines a position of the objects 115 along a dimension (e.g. a z-axis). Dimensional coordinate information including a coordinate along a z-axis defines a position of an object 115 with respect to a foreground and a background of the vector design. For instance, an object 115-1 that has z-coordinate information indicating a closer position to the foreground than another object 115-2 will visually occlude the other object 115-2 when the objects 115-1 and 115-2 overlap in the vector design 111. Likewise, if the object 115-1 has z-coordinate information indicating a closer position to the background than another object 115-2, the other object 115-2 will visually occlude the object 115-1 when the objects 115-1 and 115-2 overlap in the vector design 111. In some examples, the objects 115 include x-axis and/or y-axis coordinate information to further define a position.

Figure 5:
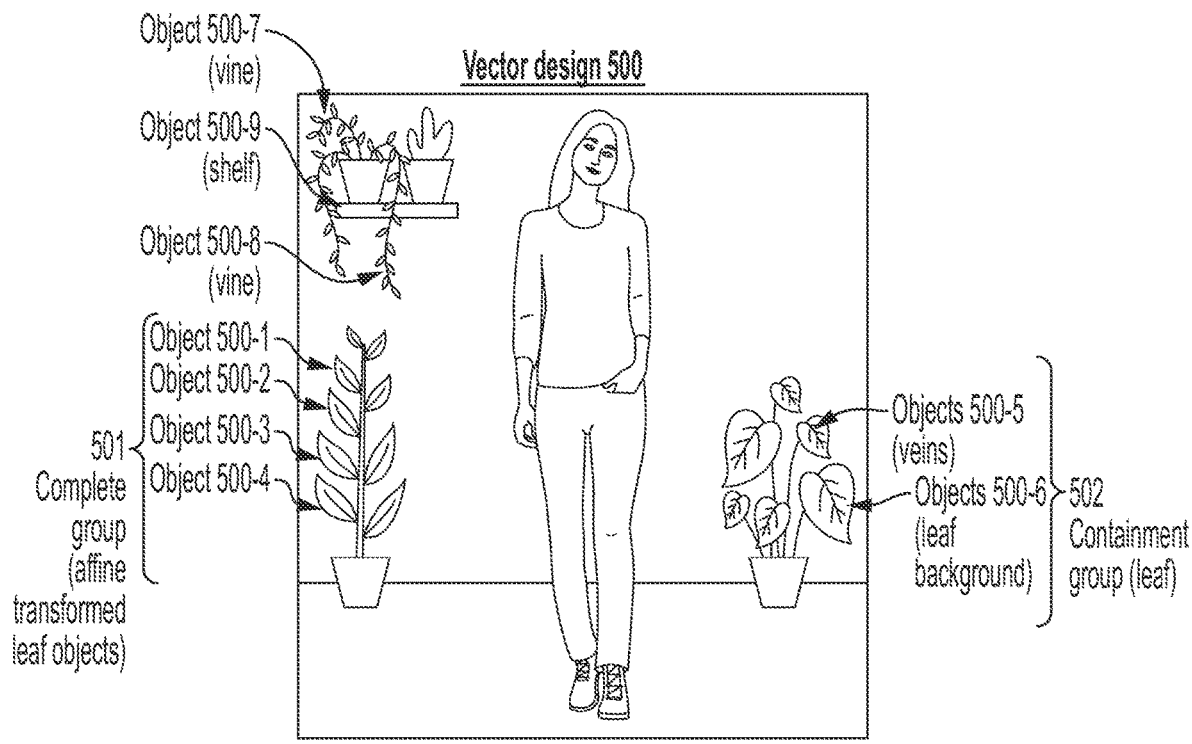
FIG. 5 depicts an example illustration of a vector design, according to certain embodiments described in the present disclosure.

A detailed example of a vector design 111 is described herein with respect to FIG. 5.

At block 220, the method 200 involves the clustering engine 120 generating an object hierarchy 131 having object groups that maintain overlaps between objects 115 in different layers. The clustering engine 120 generates the object hierarchy 131 using an agglomerative clustering algorithm that forms clusters 139 of objects 115 that correspond to levels of the object hierarchy 131. To apply the clustering algorithm, the clustering engine 120 determines pairwise similarity scores between pairs of objects 115 in the vector design 111. In some embodiment where the input vector design data 110 defines predefined groups 117, the clustering engine 120 also determines pairwise similarity scores between pairs of objects 115, between pairs of an object 115 and a predefined group 117, and between pairs of predefined groups 117. The clustering engine 120 determines to form a cluster 139 including the two objects 115 responsive to determining that the pairwise similarity score exceeds a threshold similarity score. The clustering engine 120 generates a new level in the object hierarchy 131 corresponding to the cluster 139. The clustering engine 120 generates higher levels in the object hierarchy 131 by clustering an object 115 and/or a cluster 139 to a previously formed cluster 139 to form a new cluster 139 in an agglomerative fashion. The clustering algorithm considers the z-coordinate information of objects 115 (or groups or clusters 139 of objects 115) when generating levels (or expanding or merging levels) of the object hierarchy 131 so as to maintain an order of objects 115 in the vector design 111 with respect to the foreground and the background of the vector design 111.

In the embodiments described herein, in addition to use of a similarity score analysis and consideration of z-coordinate information, the clustering algorithm involves identifying groups of objects and applying particular rules to the identified groups of objects 115 to generate the object hierarchy 131. Examples of groups of objects include predefined groups 117, containment groups 135 that include independent objects 137, complete groups 133, and clusters 139. In some embodiments, the vector design data 110 includes predefined groups 117 information identifying a group of objects 115 of the vector design 111 defined as a group. In other embodiments, the vector design data 110 does not include predefined groups 117 information. Containment groups 135 include an object 115 and independent objects 137 that are located completely within boundaries of the object 115. Complete groups 113 are groups of objects 115 that are duplicates and/or duplicates except for translation, resizing, rotation, or other affine transformation. Clusters 139 include objects 115 and groups that are clustered using the clustering algorithm and correspond to levels in the object hierarchy 131.

In some embodiments, the clustering algorithm uses a ranked queue of pairwise similarity scores to determine an order in which to cluster items (e.g. objects 115 or groups of objects) in the vector design 111. In these embodiments, the particular rules of treatment of groups of objects 115 determine how the group is treated with respect to calculating a pairwise score as compared to another item in the vector design 111 and, in some instances, whether the pairwise score associated with the group is added to the ranked queue.

The object hierarchy 131 is a hierarchical organization of the objects 115 of the vector design 111 and is also a framework to interpret user interface 103 inputs to select an object 115 or group of objects in the vector design 111. In some embodiments, the clustering engine 120 provides (or otherwise makes accessible) output vector design data 130 that includes the object hierarchy 131 to a graphics editing application 102 and the graphics editing application 102 uses the object hierarchy 131 as a framework to interpret user interface 103 inputs to select an object 115 or group of objects 115 in the vector design 111.

Figure 3:
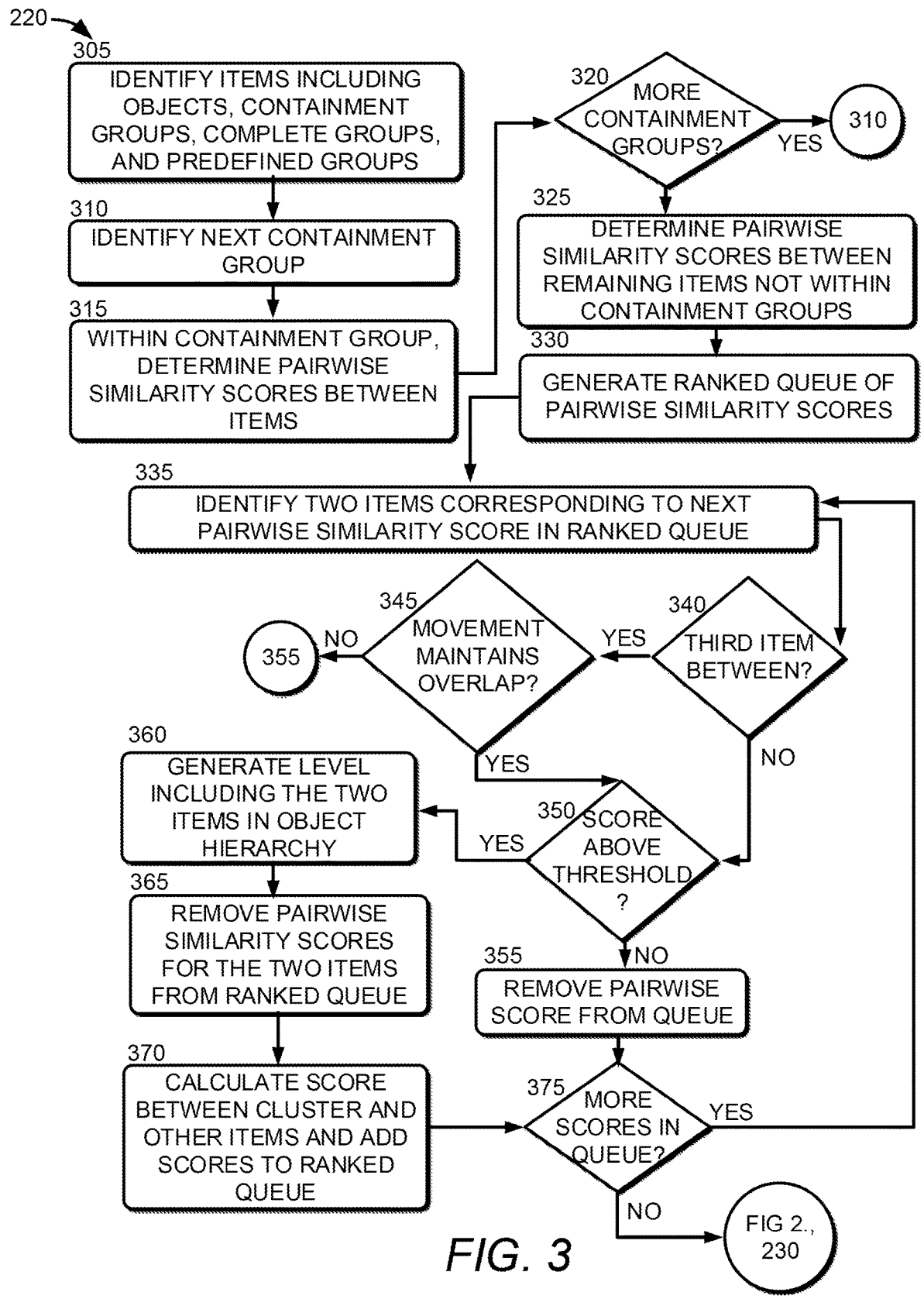
FIG. 3 depicts an example of a method of generating an object hierarchy having object groups that maintain overlaps between objects in different layers, according to certain embodiments described in the present disclosure.

A detailed example of generating an object hierarchy 131 for a vector design 111 using a clustering algorithm is described in FIG. 3.

At block 230, the method 200 involves the graphics editing application 102 receiving a user input selecting a level in the object hierarchy 131. In an example, a graphics editing application 102 of the presentation computing device 101 displays the vector design 111, which is accessed by a user, via the user interface 103. The graphics editing application 102 detects an input, which is input by the user, selecting an object 115 in the vector design 111 via the user interface 103. The graphics editing application 102 identifies the object 115 corresponding to a location on the user interface 103 of the input. The graphics editing application 102 retrieves the object hierarchy 131 associated with the vector design 111 and identifies levels of the object hierarchy 131 that include the object 115 corresponding to the location of the input.

In some examples, the graphics editing application 102 selects a default level of the object hierarchy 131 that includes the object 115 in response to detecting the input. For example, the default level is a lowest level (a level that includes the least number of objects 115) of the object hierarchy 131 that includes the selected object 115. For instance, the lowest level of the object hierarchy 131 that includes the selected object 115 could be an object level that includes the selected object 115 only. In other examples, the default level is a highest level of the object hierarchy 131 that includes the selected object 115. For instance, the highest level of the object hierarchy 131 that includes the selected object 115 includes multiple other objects 115. In other examples, the graphics editing application 102 determines a number of levels of the object hierarchy 131 that include the selected object and the default level is a median level of the identified levels. For instance, the object hierarchy has five levels that include the selected object 115 and the graphics editing application 102 selects the third level of the hierarchy. In some examples, the graphics editing application 102 includes settings, which are configured by a user, to define how the graphics editing application 102 determines the default level of the object hierarchy 131 to select in response to receiving an input selecting an object 115. In some examples, the default level of the hierarchy includes other objects 115 in addition to the selected object 115 and the graphics editing application 102 expands the selection of the selected object 115 to include a selection of the other objects 115. The graphics editing application 102 determines objects 115 included within the selected level, including objects 115 included in lower order levels encompassed by the selected level.

In some embodiments, the graphics editing application 102 receives an additional input, which is provided by a user, specifying a level of the object hierarchy 131 or navigating from a default level to a desired level. In some examples, the graphics editing application 102 displays a contextual menu (or other user interface 103 object) that lists levels of the object hierarchy 131 that include the selected object 115 and an indication of a level of the object hierarchy 131 corresponding to a current selection of objects 115 in the vector design 111. In these examples, the graphics editing application 102 expands a selection to include additional objects 115 by moving up one or more levels in the object hierarchy 131 or contracts the selection to encompass less objects 115 by moving down one or more levels in the object hierarchy 131 responsive to detecting one or more inputs to navigate between levels of the object hierarchy. In some examples, the graphics editing application 102 detects a scroll input via the user interface 103 (e.g. by using a scroll wheel on a mouse) requesting to navigate between levels of the object hierarchy 131 in the contextual menu. In some examples, the graphics editing application 102 displays the contextual menu that includes the levels of the object hierarchy 131 in response to detecting the selection of the object 115 and indicates, in the contextual menu, the default level of the object hierarchy 131. In certain examples, the graphics editing application 102 displays labels associated with one or more levels of the object hierarchy 131. For instance, the graphics editing application 102 accesses label information including a respective label for one or more of the levels of the object hierarchy 131. In certain examples, the clustering engine 120 determines the label information. For instance, the clustering engine 120 determines a label associated with a level of the object hierarchy 131 by applying an object recognition algorithm to the cluster corresponding to the level.

In some examples, as the graphics editing application 102 expands or contracts the selection of objects 115 in the vector design 111 in accordance with a navigation between levels of the object hierarchy 131, the graphics editing application 102 displays, via the user interface 103, an indication of currently selected objects 115 in response to detecting the navigation from a previous level to a subsequent level of the object hierarchy 131.

Figure 6:
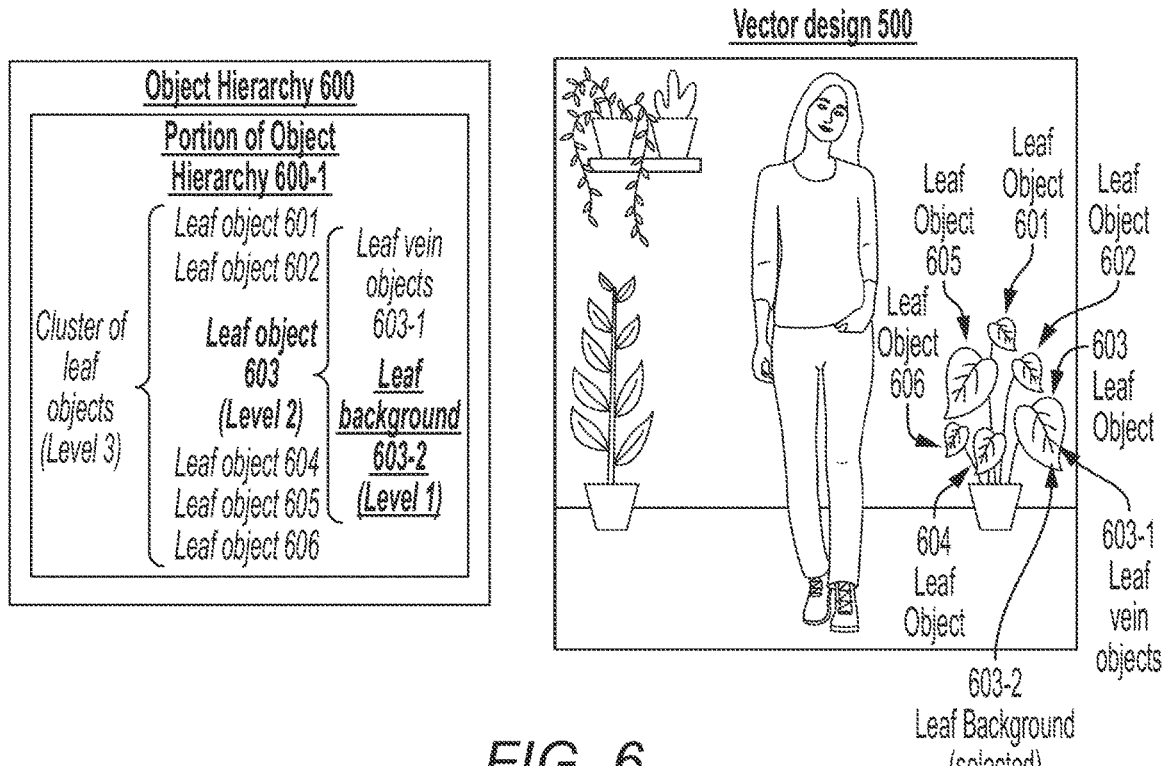
FIG. 6 depicts an example illustration of a vector design and a selection of an object in the vector design as in FIG. 5 at a level of an object hierarchy, according to certain embodiments described in the present disclosure.

A detailed example of selecting a level in an object hierarchy 131 is described in FIG. 5 and a detailed example of refining a selection by navigating to a subsequent level in an object hierarchy is described in FIG. 6.

At block 240, the method 200 involves the graphics editing application 102 applying, in the vector design 111, an edit to objects 115 assigned to the level in the object hierarchy 131. Edits could involve changing properties or parameters of the selected object 115 or selected group of objects 115. Edits could involve changing a color, deletion, rotation, duplication, translation, duplication with translation, resizing, shading, modifying transparency or opacity, changing a coordinate along a z-axis or other axis, or other edits supported by the graphics editing application 102. After applying the edit to the object 115 or objects 115 in the selected level of the object hierarchy 131, the graphics editing application 102 displays an updated vector design 111 with the edit applied to the object 115 or objects 115 in the selected level.

FIG. 3 depicts an example of a method for generating, at block 220 of the method 200, an object hierarchy 131 having object groups that maintain overlaps between objects 115 in different layers, according to certain embodiments. The method for implementing block 220 is described with reference to the components illustrated in FIG. 1, although other implementations are possible. For example, the program code for the clustering engine 120, which is stored in a non-transitory computer-readable medium, is executed by one or more processing devices to cause the clustering engine 120 to perform one or more operations described herein. The method for implementing block 220 is performed for objects 115 of the vector design 111 included in vector design data 110.

At block 305, the method for implementing block 220 involves the clustering engine 120 identifying items in the vector design 111 including objects 115, containment groups 135, complete groups 133, and predefined groups 117. In some embodiments, the vector design data 110 includes data identifying objects 115 in the vector design and boundaries of the objects 115 in the vector design.

In some embodiments, the clustering algorithm does not allow objects 115 within a predefined group 117 defined in the vector design data 110 to be clustered with other objects 115 within the predefined group 117 when generating the object hierarchy 131. In these embodiments, the clustering algorithm allows clustering of the predefined group 117 as a unit with other objects 115 and groups of objects 115 outside of the predefined group 117 in the vector design 111. In these embodiments, the clustering engine 120 receives instructions, which are requested by a user or other operator of the presentation computing device 101, to configure the clustering algorithm not to allow objects 115 within predefined groups 117 to be clustered.

In some embodiments, the clustering engine 120 identifies and considers complete groups 133 when generating the object hierarchy 131. A complete group 133 is a group of objects that are identical or that are identical except for rotation, translation, rescaling, or other affine transformation of any of the objects 115 in the complete group 133 as compared to the other objects 115 in the complete group 133. For instance, the clustering engine 120 detects multiple objects that either are duplicates in the vector design 111 (e.g. key objects 115 on a calculator) or are duplicates except for a rotation, a translation, a rescaling, or other affine transformation (e.g. three blade objects 115 of a fan that are each rotated 120 degrees from the other two blade objects 115) and generates complete groups 133 for each set of detected duplicate or affine-transformed objects 115.

In some embodiments, the clustering algorithm identifies and considers containment groups 135 when generating the object hierarchy 131. A containment group 135 includes an object 115 having boundaries that contain one or more independent objects 137. An example of a containment group 135 is a calculator base object with key objects with boundaries of the calculator base object, where the boundaries of the calculator base object contain boundaries of the key objects (which are classified as independent objects 137). In this example, the clustering algorithm identifies the calculator base object and key objects and defines a containment group 135 by the boundaries of the calculator base object. The clustering engine 120 is able to generate a logical object hierarchy 131 by identifying the containment group 135 and applying special rules to the containment group 135. For example, the clustering algorithm clusters independent objects 137 within the containment group 135 together but does not cluster an independent object 137 with an object 115 that is outside of the containment group 135. In the example of the calculator containment group 135, a logical object hierarchy 131 could cluster all of the calculator key objects 115 into a cluster 139 of objects but could not cluster any of the key objects 115 with other objects 115 outside of the containment group 135 defined by the boundaries of the calculator base object 115.

In the embodiments described herein, the ranked queue provides an order in which the clustering algorithm considers whether to cluster items to generate new levels of the object hierarchy 131. In the method of blocks 310-330, the clustering engine 120 first determines pairwise scores among independent objects 137 and groups of objects 115 that are within containment groups 135 before determining pairwise scores among independent objects 137 and groups of objects 115 that are not within containment groups 135. The method of blocks 310-330 thus prevents pairwise scores comparing independent objects 137 (or groups of objects 115) within a containment group 135 to objects 115 outside of the containment group 135 from being added to the ranked queue, which prevents such pairs of items from being clustered by the clustering algorithm. Preventing such pairing is useful because clustering independent objects 137 with objects 115 outside of the containment group 135 could result in an illogical object hierarchy 131. In other embodiments, the clustering engine 120 determines pairwise similarity scores between all objects 115 in the vector design 111, adds all the scores to the ranked queue, and then removes any pairwise similarity scores from the queue that are between independent objects 137 or other items within a containment group 135 and items outside of the containment group 135.

In other embodiments, instead of or complementary to a ranked queue, the clustering engine 120 logs pairwise similarity scores in a matrix. In an example, the clustering engine 120 logs pairwise similarity scores in an upper diagonal matrix instead of a square matrix, which would result in duplication of pairwise similarity scores. In this example, the clustering engine 120 uses an upper diagonal matrix because, in the embodiments described herein, pairwise similarity scores for any two items are symmetric. For instance, the pairwise similarity score comparing the first item to the second item is equivalent to a pairwise similarity score comparing the second item to the first item.

At block 310, the method for implementing block 220 involves the clustering engine 120 identifying a next containment group 135. The clustering engine 120 identifies the next containment group 135 and independent objects 137 and groups of objects 115 (e.g. complete groups 133, predefined groups 117, etc.) having boundaries that are within boundaries of the containment group 135. In some instances, a containment group 135 is nested within another containment group 135. In these instances, the clustering engine 120 identifies the containment group 135 having the innermost boundaries as the next containment group 135 for which to perform blocks 315 and 320.

At block 315, the method for implementing block 220 involves the clustering engine 120 determining, within the containment group 135, pairwise similarity scores between items. The clustering engine 120 determines a pairwise similarity score between each unique pair of items located within boundaries of the containment group 135. An item could be an independent object 137, a complete group 133, a predefined group 117, or another containment group 135. A detailed example of a method to determine pairwise similarity scores between pairs of items is described in FIG. 4.

At block 320, the method for implementing block 220 involves the clustering engine 120 determining, if there are more containment groups 135 in the vector design 111.

If there are one or more containment groups 135 in the vector design 111, the method for implementing block 220 returns to block 310. For example, the clustering engine 120 repeats blocks 310 (identifying the next containment group 135) and 315 (determining pairwise similarity scores of items within the containment group 135) for each identified containment group 135 in the vector design 111 until no containment groups 135 are remaining for which blocks 310 and 315 have not been performed.

If there are not any more containment groups 135 in the vector design 111 for which blocks 310 and 315 have not been performed, the method for implementing block 220 proceeds to block 325.

At block 325, the method for implementing block 220 involves the clustering engine 120 determining pairwise similarity scores between remaining items not within containment groups 135. The clustering engine 120 determines a pairwise similarity score between each unique pair of items that are not located within boundaries of any containment group 135. An item could be an independent object 137, a complete group 133, a predefined group 117, or a containment group 135. A detailed example of a method to determine pairwise similarity scores between pairs of items is described in FIG. 4.

In some embodiments, all objects 115 in the vector design 111 are within at least one containment group 135 and step 325 is not performed. In these embodiments, for instance, any objects 115 not within a containment group 135 defined by boundaries of another object 115 are within a virtual containment group defined by boundaries of the vector design 111. In these embodiments, method for implementing block 220 proceeds from block 320 to block 330 after steps 310 and 315 are repeated for each identified containment group 135 (including the virtual containment group) within the vector design 111.

At block 330, the method for implementing block 220 involves the clustering engine 120 generating a ranked queue of pairwise similarity scores. The clustering engine 120 populates the ranked queue of pairwise similarity scores with the pairwise similarity scores determined in blocks 315 and 325. The clustering engine 120 ranks the pairwise similarity scores from highest pairwise similarity score to lowest pairwise similarity score indicating a ranking of pairs of items from a highest similarity to a lowest similarity between items in each respective pair. In an example, the clustering engine 120 stores the ranked queue in a database and associates an identity of the first item and an identity of the second item with the pairwise similarity score that compares the first item to the second item.

At block 335, the method for implementing block 220 involves the clustering engine 120 identifying the next two items corresponding to the next pairwise similarity score in the ranked queue. The next pairwise similarity score in the ranked queue corresponds to the highest pairwise similarity score in the ranked queue. In an example, the clustering engine 120 determines the first item identity and the second item identity associated with the next pairwise similarity score in the ranked queue.

At block 340, the method for implementing block 220 involves the clustering engine 120 determining whether a third item has a z-coordinate value that is between z-coordinate values of the two items corresponding to the pairwise similarity score in the ranked queue. For example, the clustering engine 120 determines whether the two items have adjacent coordinates along the z-axis of the vector design 111 or whether one or more items are between the two items along the z-axis. The clustering engine 120 clusters two objects 115 that are in adjacent positions along a z-axis if the pairwise similarity score comparing the two objects 115 is above the threshold similarity score.

If no third item has a z-coordinate value that is between z-coordinate values of the two items corresponding to the pairwise similarity score in the ranked queue, the method for implementing block 220 proceeds to block 350. For instance, the clustering engine 120 determines whether the pairwise similarity score is greater than a threshold similarity score. If the pairwise similarity score is greater than the threshold similarity score, the clustering engine 120 clusters 139 the two items to generate a new level in the object hierarchy 131. However, if the pairwise similarity score is less than the threshold similarity score, the clustering engine 120 removes the pairwise similarity score from the ranked queue and proceeds to the next pairwise similarity score in the ranked queue and determines whether to cluster the pair of items associated with the next pairwise similarity score using the methods described herein.

However, if a third item has a z-coordinate value that is between z-coordinate values of the two items corresponding to the pairwise similarity score in the ranked queue, the method for implementing block 220 proceeds to block 345.

At block 345, the method for implementing block 220 involves the clustering engine 120 determining whether movement of the two items so that the two items are adjacent along a z-axis would maintain an overlap between one or both of the two items with a third item that is between the two items with respect to the z-axis. If the two items are not in adjacent positions along the z-axis, the clustering engine 120 moves either or both of the two objects 115 so that the two objects 115 are in adjacent positions along the z-axis and then clusters the two objects 115 if the movement of objects 115 to adjacent positions along the z-axis maintains an overlap between one or both objects 115 with respect to a third object 115.

If moving one or both of the items so that the two items are adjacent on the z-axis results in not maintaining the overlap of one or both items with the third item, the method for implementing block 220 proceeds to block 355. At block 355, the pairwise score is removed from the ranked queue. After block 355, the method for implementing block 220 proceeds to block 375 and the clustering engine 120 determines whether there are additional pairwise scores in the ranked queue.

However, if moving one or both of the items so that the two items are adjacent on the z-axis results in maintaining the overlap of one or both items with the third item, the method for implementing block 220 proceeds to block 350.

At block 350, the method for implementing block 220 involves the clustering engine 120 determining whether the pairwise similarity score comparing the two items is above the threshold pairwise similarity score.

If the pairwise similarity score comparing the two items is not above the threshold similarity score, the method for implementing block 220 proceeds to block 355. At block 355, the method for implementing block 220 involves removing the pairwise score from the ranked queue. After block 355, the method for implementing block 220 proceeds to block 375 and the clustering engine 120 determines whether there are additional pairwise scores in the ranked queue.

However, if the pairwise similarity score comparing the two items is above the threshold similarity score, the method for implementing block 220 proceeds to block 360.

At block 360, the method for implementing block 220 involves the clustering engine 120 generating a level including the two items in the object hierarchy 131. For instance, the clustering engine 120 forms a cluster 139 that includes the two items and generates a level in the object hierarchy 131 corresponding to the cluster 139. In some instances, if the cluster 139 is formed of another cluster 139 and a second item, the clustering engine 120 generates a higher level in the object hierarchy 131 corresponding to the cluster 139 that includes the second item and a lower level corresponding to the other cluster 139. In some examples, instead of forming a new cluster 139, the clustering engine 120 merges an object 115 and/or a cluster 139 into another cluster 139 to expand an existing level of the object hierarchy 131 corresponding to the other cluster 139.

In some embodiments, in addition to clustering the two items and generating the level in the object hierarchy 131, the clustering engine 120 applies an object recognition algorithm to the cluster to determine a label for the cluster and the corresponding level of the object hierarchy 131. For instance, the clustering engine 120 generates a single rasterized image of the items in the cluster and then applies an object recognition algorithm to the single rasterized image to identify a label to apply to the cluster. In an example, if the clustering engine 120 determines a label for the cluster using the object recognition algorithm, the clustering engine 120 associates the label with the cluster and the level in the object hierarchy 131. In this example, however, if the clustering engine 120 is unable to determine a label using the clustering algorithm or if the identified label is generic, the clustering engine 120 does not label the cluster and the corresponding level in the object hierarchy 131. For instance, the clustering engine 120 identifies the label as generic if the clustering engine 120 identifies the label in a list of generic labels and non-generic if the clustering engine 120 does not identify the label in the list of generic labels. Examples of generic labels include labels such as "rectangle," "square," "circle," while examples of non-generic labels not found on the list of generic labels include "microwave oven," "electric range," and "electric range burner."

At block 365, the method for implementing block 220 involves the clustering engine 120 removing pairwise similarity scores for the two items from the ranked queue. After clustering two items into a level of the object hierarchy, the clustering engine 120 removes any pairwise similarity scores comparing either the first item or the second item to another item.

At block 370, the method for implementing block 220 involves the clustering engine 120 calculating a pairwise similarity score between the cluster and other items in the ranked queue and adding the calculated scores to the ranked queue. The clustering engine 120, for each removed pairwise similarity score comparing either the first item or the second item to another item, the clustering engine 120 replaces the removed pairwise similarity score with a pairwise similarity score comparing the new level of the object hierarchy 131 with the other item. The clustering engine 120 removes any duplicate pairwise similarity scores comparing any two items from the ranked queue. The clustering engine 120 reshuffles the ranked queue as necessary so that an order of highest to lowest pairwise similarity score is maintained.

In some embodiments, where the clustering engine 120 logs pairwise similarity scores in an upper diagonal matrix, the clustering engine 120 updates the upper diagonal matrix by removing rows and columns corresponding to the first and second item that were clustered from the upper diagonal matrix, inserting the new cluster 139 as a new row and column of the matrix, and calculating pairwise similarity scores to insert in nodes of the new row and the new column.

At block 370, the method for implementing block 220 involves the clustering engine 120 determining whether there are additional pairwise similarity scores in the ranked queue.

If there are additional pairwise similarity scores in the ranked queue, the method for implementing block 220 returns to 335. The clustering engine repeats blocks 335-375 as depicted in FIG. 3 until no further pairwise similarity scores remain in the ranked queue.

However, if there are no additional pairwise similarity scores in the ranked similarity queue, the method for implementing block 220 ends and the method 200 continues at block 230 of FIG. 2.

Figure 4:
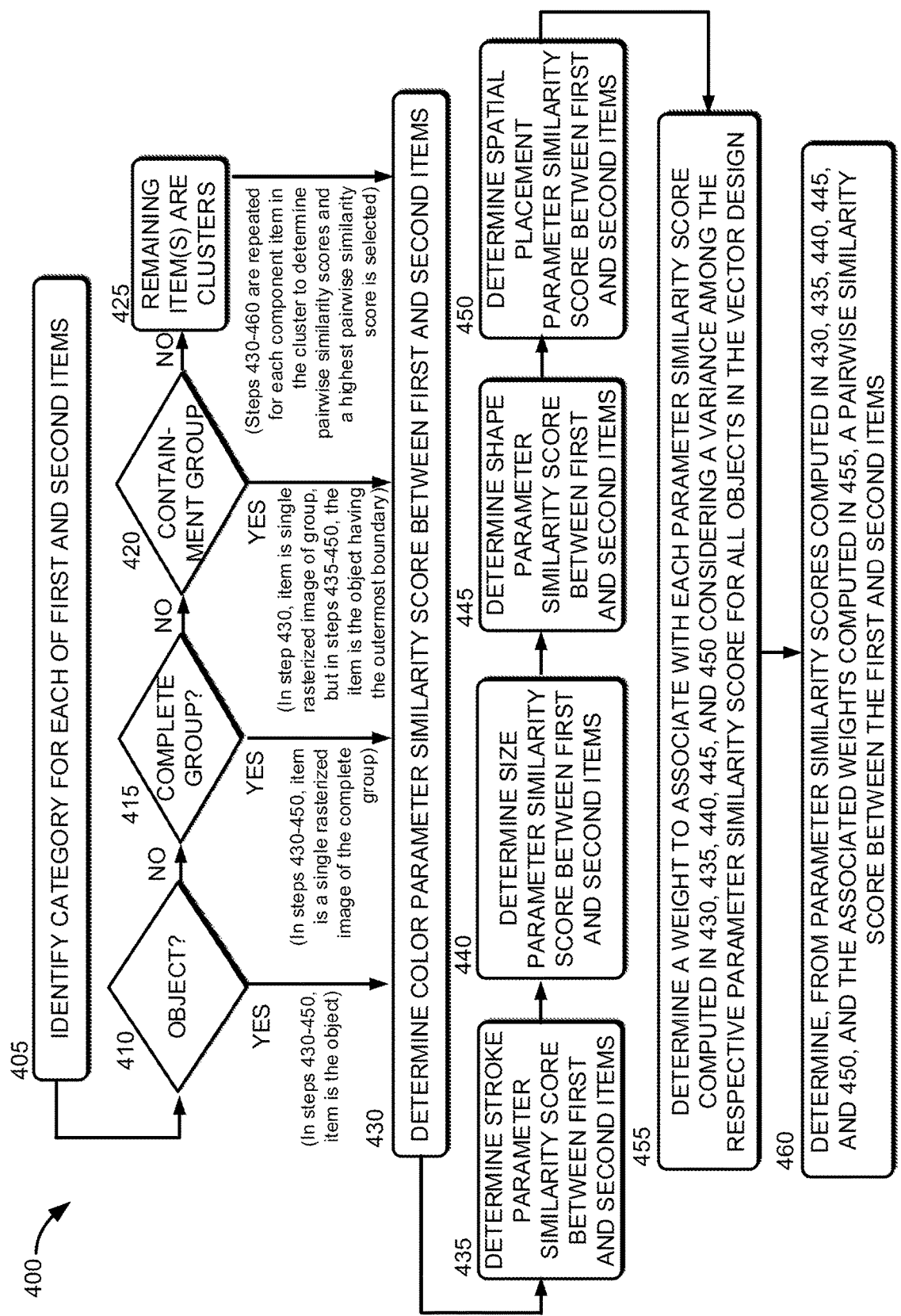
FIG. 4 depicts an example of determining pairwise similarity scores between items for generating the object hierarchy of FIG. 3, according to certain embodiments described in the present disclosure.

FIG. 4 depicts an example of a method 400 for determining pairwise similarity scores between items for generating the object hierarchy 131 of FIG. 3, according to certain embodiments. For example, FIG. 3 describes determining pairwise similarity scores between items (e.g. objects or groups) within containment groups 135 at block 315 and describes determining pairwise similarity scores between remaining items (e.g. objects or groups) not within containment groups 135 at block 325. For illustrative purposes, the method for determining pairwise similarity scores between items for generating the object hierarchy 131 is described with reference to the components illustrated in FIG. 1, although other implementations are possible. For example, the program code for the clustering engine 120, which is stored in a non-transitory, computer-readable medium, is executed by one or more processing devices to cause the clustering engine 120 to perform one or more operations described herein.

At block 405, the method 400 involves the clustering engine 120 identifying a category for each of the first and second items. For instance the clustering engine 120 determines an item category for the first item and an item category for the second item for determining a pairwise similarity score comparing the first and second items. In the following blocks 410-425, the clustering engine 120 identifies an item type (e.g. a complete group 133, a containment group 135, an independent object 137, a predefined group 117, a cluster 139, an object 115) and the remainder of the steps of method 400 at blocks 430-460 are modified in accordance with the determined item types of the first item and the second item.

At block 410, the method 400 involves the clustering engine 120 determining whether any of the two items is an unclustered object 115 or an independent object 137. An unclustered object 115 has not been clustered with any other groups or objects 115 in the vector design 111. An independent object 137 is an object 115 that is within a containment group 135.

If an item is determined to be an unclustered object 115 or an independent object 137, the method 400 involves treating the unclustered object or the independent object 137 (whichever is applicable) as the respective first item or the second item (as applicable) as described blocks 430-460. Further, if both items have been categorized, the method 400 proceeds to block 430, but if one item has not been categorized, the method 400 proceeds to block 415.

If neither of the first item nor the second item is determined to be an unclustered object 115 or an independent object 137 or one or both of the two items has not been categorized, the method 400 continues to block 415.

At block 415, the method 400 involves the clustering engine 120 determining whether any of the two items is a complete group 133.

If an item is determined to be a complete group 133, the method 400 involves treating the complete group 133 as a single rasterized image when proceeding through blocks 430-460. For instance, the clustering engine 120 captures an image of the complete group 133 of objects 115 and treats the image as a single object 115 for the purposes of determining the pairwise similarity score. Further, if both items have been categorized, the method 400 proceeds to block 430, but if one item has not been categorized, the method 400 proceeds to block 420.

If no item is determined to be a complete group or one or both of the two items has not been categorized, the method 400 continues to block 420.

At block 420, the method 400 involves the clustering engine 120 determining whether either or both of the two items is a containment group 135.

If an item is determined to be a containment group 135, the method 400 involves treating the containment group 137 as a single rasterized image for block 430 and treating the containment group 137 as the component object 115 of the containment group that has the outermost boundary when proceeding through blocks 435-460. Further, if both items have been categorized, the method 400 proceeds to block 430, but if one item has not been categorized, the method 400 proceeds to block 425.

If no item is determined to be a containment group or one or both of the two items has not been categorized, the method 400 continues to block 425.

At block 425, the method 400 involves the clustering engine 120 determining that any remaining items not categorized at blocks 410, 415, and 420 are clusters 139. For items in the pair of items (the first item and/or the second item) determined to be clusters 139, the clustering engine 120 uses a single-linkage principle and treats the cluster 139 as a component item of the cluster 139 that results in calculating a highest pairwise similarity score. For instance, the clustering engine 120 identifies component items (objects 115, complete groups 133, containment groups 135) that make up the cluster 139. For each component item, the clustering engine 120 determines a pairwise similarity score according to blocks 430-460 while applying special rules for treatment of the component item identified in blocks 410, 415, and/or 420 as applicable. The clustering engine 120 ranks the determined pairwise similarity scores in block 460 treating the cluster 139 as the respective component item and selects a highest pairwise similarity score in block 460 as the pairwise similarity score.

At block 430, the method 400 involves the clustering engine 120 determining a color parameter similarity score between the first and second items. The clustering engine 120 determines a fill color for the first item and a fill color for the second item as values in a color space. Examples of color spaces include cyan-magenta-yellow key ("CMYK"), red-green-blue ("RGB"), grayscale, and International Commission on Illumination ("LAB") color spaces. In some examples, the clustering engine 120 converts the color space values of each of the first item and the second item to LAB color space values along three color channels of lightness, green-red, and blue-yellow. In some examples, the clustering engine 120 uses color spaces other than LAB color space.

In some embodiments, when each of the two items include a flat fill color, the clustering engine 120 determines a color parameter score, $S_{color}$, using the following formula:

$$S_{color} = 1 - \frac{\Delta E^*_{c_i c_j}}{\Delta E^*_{c_{min} c_{max}}} \tag{1}$$

where $\Delta E^*_{c_i c_j}$ represents a difference between a fill color $c_i$ of a first item i and a fill color $c_j$ of a second item j and where $\Delta E^*_{c_{min} c_{max}}$ represents a difference between a minimum value and maximum value in the color space. For instance, in the LAB color space, $c_{min}$ is (0, −128, −128) and $c_{max}$ is (100, 127, 127), where the three color channels of the color space indicate lightness (black-white), green-red, and blue-yellow color channels.

In other embodiments, when the two items do not include flat fill colors, the clustering engine 120 rescales each of the two items to a fixed size (e.g. 100 pixels by 100 pixels or other fixed size) while maintaining an aspect ratio. The clustering engine 120 reduces each of the two items to an array of flat color values in color space corresponding to the array of pixels at the fixed size. The clustering engine 120 creates a histogram of color space values for each color channel in the color space for each of the two items. Accordingly, the clustering engine 120 generates three histograms for each of the two items. The three-color channel histograms for the first item and the three-color channel histograms for the second item are populated with corresponding color channel values from the array of flat color values for the first item and the array of flat color values for the second item, respectively. The clustering engine 120 determines three-color channel similarity scores to compare the two items. To determine each of the three-color channel similarity scores, the clustering engine 120 compares the pair of histograms (one from each of the first and second items) for each color channel. In some embodiments, the clustering engine 120 uses the following formula to determine the color parameter score $S_{color}$ $$s_{color} = \frac{1}{3} * \sum_{l=0}^{3} \frac{\sum_{k=c_{min}[l]}^{c_{max}[l]} \min(H[l]k_{o_i}, H[l]k_{o_j})}{\sum_{k=c_{min}[l]}^{c_{max}[l]} \max(H[l]k_{o_i}, H[l]k_{o_j})} \tag{1-1}$$

where $H[l]k_{o_i}$ is the value corresponding to entry k of the histogram for the first item $o_i$ for color channel l, $H[l]k_{o_j}$ is the value corresponding to entry k of the corresponding histogram for the second item $o_j$ for color channel l, $c_{min}[l]$ is the minimum permitted value for the color channel l, and $c_{max}[l]$ is the maximum permitted value for the color channel l.

At block 435, the method 400 involves the clustering engine 120 determining a stroke parameter similarity score between the first and second items. The clustering engine 120 determines compares the first item and the second item to determine a stroke width sub-score SW, a line cap style sub-score LC, a line join style sub-score (LJ), a dash array sub-score (DA), and a stroke color sub-score (SC). The clustering engine 120 determines a stroke parameter similarity score $S_{stroke}$ using the following equation:

$$S_{stroke} = \frac{SW + LC + LJ + DA + SC}{5} \quad (2)$$

which determines an average of the five sub-scores.

The clustering engine 120 determines the stroke width sub-score SW comparing the first item $o_i$ to the second item $o_j$ using the following formula:

$$SW = 1 - \frac{|sw_{o_i} - sw_{o_j}|}{\max(sw_{o_i}, sw_{o_j})} \quad (2\text{-}1)$$

where $sw_{o_i}$ represents the stroke width of the first item $o_i$ and $sw_{o_j}$ represents the stroke width of the second item $o_j$.

The clustering engine 120 determines the line cap style sub-score LC comparing the first item $o_i$ to the second item $o_j$. If the line cap styles of the first and second items are the same, the line cap style score LC is 1 and if the line cap styles are different, the line cap style score LC is 0, as shown in the following formula:

$$LC = \begin{cases} 1, & \text{if } lc_{o_i} = lc_{o_j} \\ 0, & \text{otherwise} \end{cases} \quad (2\text{-}2)$$

In this formula, $lc_{o_i}$ represents the line cap style of the first item $o_i$ and $lc_{o_j}$ represents the line cap style of the second item $o_j$. Examples of line cap styles include butt cap and round cap.

The clustering engine 120 determines the line join style sub-score LJ comparing the first item $o_i$ to the second item $o_j$. If the line join styles of the first and second items are the same, the line join style score LJ is 1 and if the line join styles are different, the line join style score LJ is 0, as shown in the following formula:

$$LJ = \begin{cases} 1, & \text{if } lj_{o_i} = lj_{o_j} \\ 0, & \text{otherwise} \end{cases} \quad (2\text{-}3)$$

In this formula, $lj_{o_i}$ represents the line join style of the first item $o_i$ and $lj_{o_j}$ represents the line join style of the second item $o_j$. Examples of line join style include bevel join and miter join.

The clustering engine 120 determines the dash array sub-score DA comparing the first item $o_i$ to the second item $o_j$. The clustering engine 120 identifies a dash array for the first item $da_{o_i}$ and a dash array for the second item $da_{o_j}$. The clustering engine determines a length of the dash array for the first item $\|da_{o_i}\|$ and a length for the dash array for the second item $\|da_{o_j}\|$, and then traverses both arrays up to their minimum common length to count matching entries, as represented by the following computation:

$$DA = \frac{\sum_{n=1}^{N} Z_n}{\max(\|da_{o_i}\|, \|da_{o_j}\|)} \quad (2\text{-}4)$$

$$N = \min(\|da_{o_i}\|, \|da_{o_j}\|)$$

$$Z_n = \begin{cases} 1, & \text{if } da_{o_i}[n] = da_{o_j}[n] \\ 0, & \text{otherwise} \end{cases}$$

where n indexes into the arrays. The clustering engine 120 determines a dash array sub-score DA of 1 if neither of the first and second item has a dash array.

The clustering engine 120 determines the stroke color sub-score SC comparing the stroke color of the first item $o_i$ to the stroke color of the second item $o_j$ in the same way that the color parameter similarity score is determined in either equation (1) or (1-1) discussed previously, except comparing the stroke color instead of the fill color of the items.

At block 440, the method 400 involves the clustering engine 120 determining a size parameter similarity score between the first and second items. The clustering engine 120 determines an area of each of the first item and the second item, for instance, by tessellating each of the items into triangles and determining a sum of the areas of the triangles, finding an area under one or more curves, or via other methods to determine areas within items. In certain embodiments, for non-vector items (e.g. images), instead of tessellating the item into triangles and finding the sum of the area of the triangles, the area of the item is calculated by multiplying a length and a width of a bounding box of the item. The clustering engine 120 determines the size parameter similarity score using the following equation:

$$S_{size} = 1 - \frac{|A_{o_i} - A_{o_j}|}{\max(A_{o_i}, A_{o_j})} \quad (3)$$

where $|A_{o_i} - A_{o_j}|$ represents the absolute difference of the area of the first item $A_{o_i}$ and the area of the second item $A_{o_j}$ and $\max(A_{o_i}, A_{o_j})$ represents the maximum value of the two areas.

At block 445, the method 400 involves the clustering engine 120 determining a shape parameter similarity score between the first and second items. The clustering engine 120 scales the first item and the second item, maintaining an aspect ratio, to a fixed size s*s (e.g. 100 pixels by 100 pixels, or other fixed size). The clustering engine 120 linearizes the Bezier paths of the first item and the second item. For example, the clustering engine approximates the Bezier paths to small line segments. For each of the first and second items, the clustering engine 120 computes a Cartesian distance (i.e. a distance that is rounded to a nearest whole number) from the center (s/2, s/2) of the item to every path point determined from the linearization operation and generates a histogram that records a number of occurrences of every distance in the item. The minimum distance possible is zero and the maximum distance possible is $(s/\sqrt{2})$ and the total number of possibilities of whole number distances is $1+(s/\sqrt{2})$. The clustering engine 120 finds a minimum and maximum distance count in each distance entry of the histograms of the first item and the second item. The clustering engine 120 determines the shape parameter similarity score $S_{shape}$ using the following formula:

$$S_{shape} = \frac{\sum_{k=0}^{(s/\sqrt{2})} \min(Hk_{o_i}, Hk_{o_j})}{\sum_{k=0}^{(s/\sqrt{2})} \max(Hk_{o_i}, Hk_{o_j})} \quad (4)$$

where $Hk_{o_i}$ represents a value corresponding to a distance k in the histogram of the first item $o_i$ and $Hk_{o_j}$ represents a value corresponding to a distance k in the histogram of the second item $o_j$.

At block 450, the method 400 involves the clustering engine 120 determining a spatial placement parameter similarity score between the first and second items. The clustering engine 120 determines an approximate shortest distance between the first item and the second item. For example, the clustering engine 120 determines the approximate shortest distance by (1) finding the centers of each of the first item and the second item and computing a center C of an imaginary line joining the centers of the first item and the second item, (2) projecting imaginary lines from the center C at a predefined number of degrees apart (e.g. every 15 degrees), (3) determining an intersection of each of the projected lines with each of the first item and the second item, (4) recording the nearest intersection point from the center C for each of the first item and the second item, and (5) determining a distance between the two nearest intersection points as the approximate shortest distance between the first item and the second item. The clustering engine 120 can use other methods for determining the approximate shortest distance between the first item and the second item. The clustering engine 120 computes the spatial placement parameter similarity score $S_{spatial\ placement}$ using the following equation:

$$S_{spatial\ placement} = 1 - \frac{D_{o_i o_j}}{\max_{\forall i,j} D_{o_i, o_j}} \quad (5)$$

where $D_{o_i o_j}$ represents the computed approximate shortest distance between the first item and the second item.

At block 455, the method 400 involves the clustering engine 120 determining a weight to associate with each parameter similarity score computed in blocks 430, 435, 440, 445, and 450 considering a variance among the respective parameter similarity score for all objects 115 in the vector design 111. In an example (e.g. block 315 of FIG. 3) where the pairwise similarity score for two items within a containment group is calculated, the weight for each parameter similarity score is determined by comparing a variance within the parameter similarity scores for all pairwise similarity scores determined for items in the containment group 135 to a threshold variance. In another example (e.g. block 325 of FIG. 3) where the pairwise similarity score for two items that are not within a containment group 135 is calculated, the weight for a parameter similarity score is determined by comparing a variance within the parameter similarity scores for all pairwise similarity scores determined in the vector design 111 to the threshold variance. For instance, a variance of color parameter similarity scores within a containment group 135 is low when every item within the containment group is blue. In some embodiments, the clustering engine 120 determines each weight as shown in the following formula:

$$W = \begin{cases} 0, & \text{if } \max_{\forall k} U_k - \min_{\forall k} U_k \le V \\ 1, & \text{otherwise} \end{cases} \quad (6)$$

where W is the weight, where U represents the un-normalized parameter similarity score, k indexes all parameter similarity scores, and V is a threshold variance value. As shown in this formula, the clustering engine 120 does not consider a particular parameter similarity score (of the color, stroke, size, shape, and spatial placement parameter similarity scores) to determine a pairwise similarity score between two items if a variance between all the parameter similarity scores for the containment group 135 (or for an entirety of the vector design 111, as applicable) is less than or equal to a threshold variance value. As shown in this formula, the clustering engine considers a parameter similarity value when determining a pairwise similarity score between two items if the variance is greater than the threshold variance value. In another example, the weight for each parameter similarity score is a predefined value. In yet another example, the weight for each parameter similarity score is a product of the weight calculated by comparing the variance of the parameter similarity score against a threshold variance as in equation (6) and the predefined weight.

In some embodiments, the clustering engine 120 normalizes the parameter similarity scores computed in blocks 430, 435, 440, 445, and 450 and rescales their ranges to fall between zero and one using the following formula:

$$S_k = \frac{U_k - \min_{\forall k} U_k}{\max_{\forall k} U_k - \min_{\forall k} U_k} \quad (7)$$

where k indexes all parameter similarity scores, U represents an un-normalized parameter similarity score and S represents the normalized parameter similarity score corresponding to the un-normalized parameter similarity score U.

At block 460, the method 400 involves the clustering engine 120 determining, from the parameter similarity scores computed in blocks 430, 435, 440, 445, and 450, and the associated weights computed in block 455, a pairwise similarity score between the first and second items. The clustering engine 120 determines the pairwise similarity score using the following formula:

$$G_{o_i o_j} = \frac{\sum_{n=1}^{5} W_n * S_{n o_i, o_j}}{\sum_{n=1}^{5} W_n} \quad (8)$$

where the pairwise similarity score $G_{o_i o_j}$ comparing the first item $o_i$ with the second item $o_j$ is calculated as a sum of the product of each of the five parameter similarity scores and their respective determined weights divided by a sum of the weights of each of the five parameter similarity scores.

FIG. 5 depicts an example of a vector design 500, according to certain embodiments described in the present disclosure. The vector design 500 is implementable in a computer code representation. As illustrated in FIG. 5, the vector design 500 includes multiple objects, including objects 500-1, 500-2, 500-3, 500-4, 500-5, 500-6, 500-7, 500-8, and 500-9. Complete group 501 includes the leaf objects 500-1, 500-2, 500-3, and 500-4. In an example, the clustering engine 120 detects that the leaf objects 500-1, 500-2, 500-3, and 500-4 are duplicates in the vector design 500 except for translation, resizing, and/or rotation. Containment group 502 includes leaf vein objects 500-5 and leaf background object 500-6. In an example, the clustering engine 120 determines that boundaries of the leaf vein objects 500-5 are within a boundary of the leaf background object 500-6 and generates containment group 502 defined by the boundaries of the leaf background object 500-6 and including the leaf vein objects 500-5 and leaf background object 500-6. In this example, the leaf vein objects 500-5 could be a complete group 133 or a cluster 139 of all of the individual leaf vein objects 500-5.

Objects 500-7 and 500-8 of the vector design 500 are vine objects and object 500-9 is a shelf object, where vine object 500-8 partially occludes the shelf object 500-9. In a first example, the clustering engine 120 generates a new level of an object hierarchy for the vector design 500 including objects 500-7 and 500-8 responsive to determining that a pairwise similarity score comparing objects 500-7 and 500-8 are greater than a threshold similarity score and are adjacent with respect to their z-coordinates. In a second example, however, the clustering engine 120 determines that the shelf object 500-9 has z-coordinate information that indicates a z-coordinate position that is behind the vine object 500-8 but in front of the vine object 500-7. In this second example, the shelf object 500-9 is movable backward to swap z-coordinate positions with the vine object 500-7 (so that vine objects 500-7 and 500-8 are adjacent with respect to a z-axis) without affecting the occlusion of the shelf object 500-9 by the vine object 500-8. Accordingly, in this second example, the clustering engine 120 generates a level of the hierarchy that includes the vine objects 500-7 and 500-8 responsive to determining that a pairwise similarity score comparing objects 500-7 and 500-8 is above a threshold similarity score.

FIG. 6 depicts the vector design 500 depicted in FIG. 5 with an additional user selection of a level of an object hierarchy 600 associated with the vector design 500, according to certain embodiments described in the present disclosure. As illustrated in FIG. 6, the object hierarchy 600 is associated with the vector design 500 and is used to interpret a scope of a selection of objects. The vector design 500 includes leaf objects 601, 602, 603, 604, 605, and 606. Leaf object 603 includes leaf vein objects 603-1 and a leaf background object 603-2. The object hierarchy 600 includes a hierarchical organization of all objects of the vector design 500. A portion of the object hierarchy 600-1 shows three levels, including a cluster of leaf objects (Level 3), a leaf object 603 (Level 2), and a leaf background object 603-2 (Level 1). In an example, the graphics editing application 102 detects a selection corresponding to the leaf background object 603-2 via the user interface 103 of the presentation computing device 101 and determines all levels of the object hierarchy 600 that include the leaf background object 603-2, including Level 1, Level 2, and Level 3 of the portion of the object hierarchy 600-1. In this example, the graphics editing application 102 interprets a selection of leaf background object 603-2 in the vector design 500 via the user interface in accordance with one of Level 1, Level 2, or Level 3 of the object hierarchy 600. In FIG. 6, Level 3 of the object hierarchy includes leaf objects 601, 602, 604, 605, 606, and Level 2 (leaf object 603), where Level 2 includes leaf vein objects 603-1 and Level 1 (leaf background object 603-2), and Level 1 includes leaf background object 603-2. As illustrated in FIG. 6, within the portion of the object hierarchy 600-1, object identifiers included in level 3 are shown italicized, object identifiers included in level 2 are shown bolded, and object identifiers included in level 1 are shown underlined. Accordingly, leaf background object 603-2 is included, directly or indirectly, in each of levels 1, 2, and 3. In some examples, the graphics editing application 102 receives one or more inputs, which are input by a user via the user interface 103, instructing a navigation between level 1, 2, and/or 3 of the object hierarchy 600. For example, the graphics editing application 102 receives a selection of leaf background object 603-2, retrieves the object hierarchy 600, and selects level 2 of the object hierarchy 600 to expand the selection of the leaf background object 603-2 to include the leaf vein objects 603-1 in response to determining that level 2 of the object hierarchy 131 includes the leaf vein objects 603-1. In this example, the graphics editing application 102 could receive (1) a further input to navigate from level 2 of the object hierarchy 600 to level 3 of the object hierarchy, which would expand the scope of the selection to include leaf objects 601, 602, 604, 605, and 606 responsive to determining that level 3 includes those leaf objects, or (2) a further input to navigate from level 2 of the object hierarchy to level 1 of the object hierarchy, which would contract the scope of the selection to remove leaf vein objects 603-1 from the selection so that the selection encompasses only leaf background object 603-2. In certain examples, the entire object hierarchy 600 or the portion of the object hierarchy 600-1 are displayed via the user interface 103 of the presentation computing device 101 and displays an indication of the current level of the object hierarchy.

Example of a Computing System for Implementing Certain Embodiments

Figure 7:
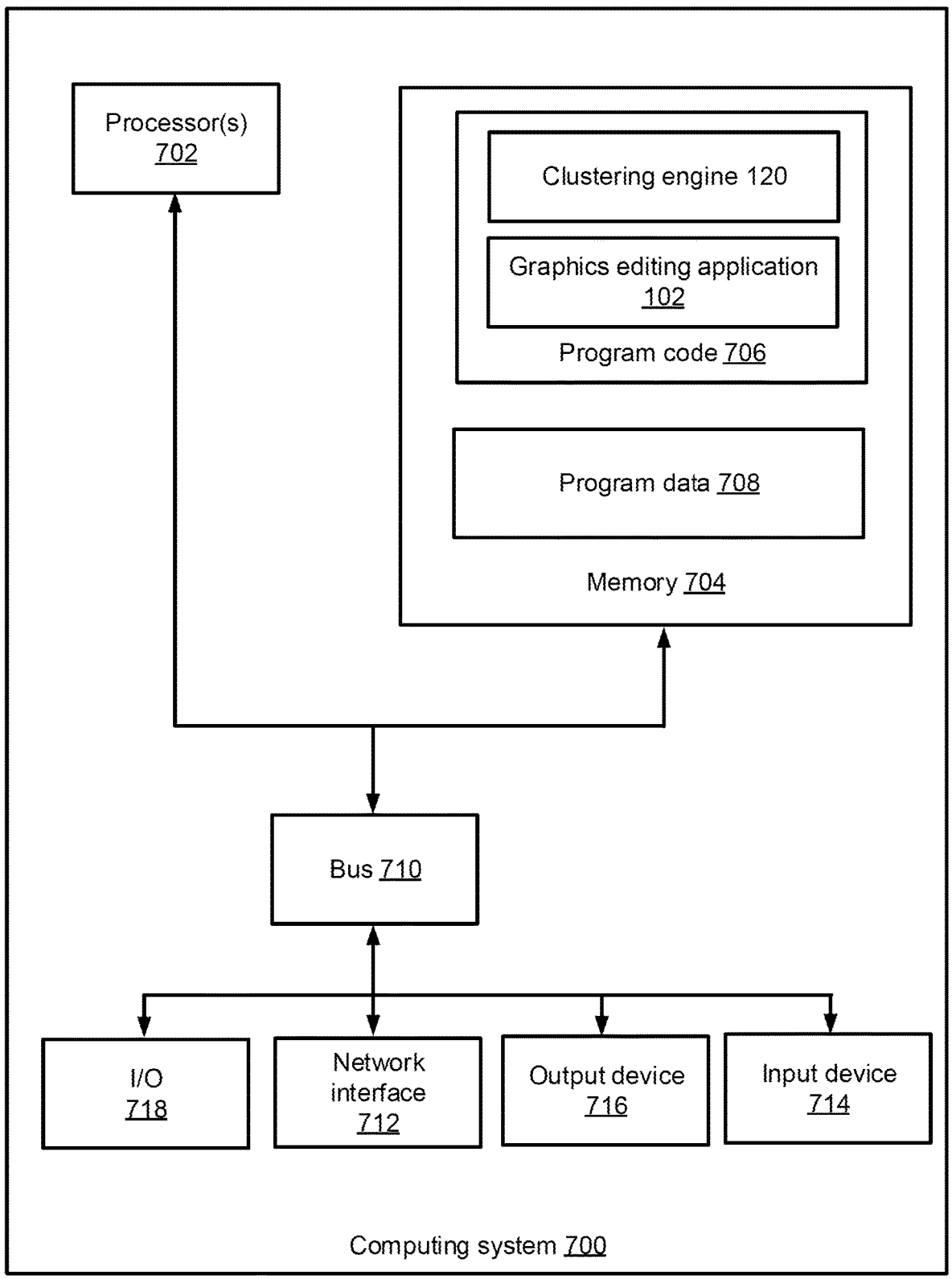
FIG. 7 depicts an example of a computing system that performs certain operations described herein, according to certain embodiments described in the present disclosure.

Any suitable computing system or group of computing systems is used for performing the operations described herein. For example, FIG. 7 depicts an example of a computing system 700. The computing system 700 includes the clustering engine 120 and the graphics editing application 102.

The depicted examples of a computing system 700 includes one or more processors 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 includes any number of processing devices, including a single processing device.

The memory device 704 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions.

The computing system 700 executes program code 706 that configures the processor 302 to perform one or more of the operations described herein. The program code 706 includes, for example, the clustering engine 120, the graphics editing application 102, or other suitable applications that perform one or more operations described herein. The program code 706 is resident in the memory device 704 or any suitable computer-readable medium and is executed by the processor 702 or any other suitable processor. The program code includes processor-specific instructions generated by a compiler or an interpreter from code written in any suitable computer-programming language, including, for example, C, C++, C #, Visual Basic, Java, Python, Perl, JavaScript, and ActionScript.

In some embodiments, program code 706 for implementing the clustering engine 120 and the graphics editing application 102 are stored in the memory device 704, as depicted in FIG. 6. In additional or alternative embodiments, program code 706 for the clustering engine 120 and/or the graphics editing application 102 is stored in different memory devices of different computing systems. In additional or alternative embodiments, the program code 706 described above is stored in one or more other memory devices accessible via a data network.

The computing system 700 accesses program data 708, which includes one or more of the datasets described herein (e.g., the vector design data 110, the vector design 111, the predefined groups information 117, the output vector design data 130, the object hierarchy 131), in any suitable manner. In some embodiments, some or all of one or more of these data sets, models, and functions are stored as the program data 708 in the memory device 704, as in the example depicted in FIG. 7. In additional or alternative embodiments, one or more of these data sets, models, and functions are stored in the same memory device (e.g., one of the memory device 704). For example, a common computing system, such as the clustering engine 120 depicted in FIG. 1, includes hardware, software, or both that implements the clustering engine 120 and the graphics editing application 102. In additional or alternative embodiments, one or more of the programs, data sets, models, and functions described herein are stored in one or more other memory devices accessible via a data network.

The computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and the like. The computing system 700 is able to communicate with one or more other computing devices (e.g., presentation computing device 101) via a data network using the network interface device 712.

The computing system 700 also includes a number of external or internal devices, such as input or output devices. For example, the computing system 700 is shown with one or more input/output ("I/O") interfaces 718. An I/O interface 718 receives input from input devices or provide output to output devices. One or more buses 710 are also included in the computing system 700. The bus 710 communicatively couples one or more components to other components of the computing system 700.

In some embodiments, the computing system 700 also includes the input device 714 and the output device 716 depicted in FIG. 7. An input device 714 includes any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. An output device 716 includes any device or group of devices suitable for providing visual, auditory, or other suitable sensory output. Non-limiting examples of the output device 716 include a touchscreen, a monitor, a speaker, a separate mobile computing device, etc.

Although FIG. 7 depicts the input device 714 and the output device 716 as being local to the computing system 700 that executes the program code 706, other implementations are possible. For instance, in some embodiments, one or more of the input device 714 and the output device 716 includes a remote client-computing device that communicates with the computing system 700 via the network interface device 712 using one or more data networks described herein. In some embodiments, the presentation computing device 101 comprises the output device 716 and/or the input device 714 and is communicatively coupled to the computing system 700 via the network interface 712.

Figure 8:
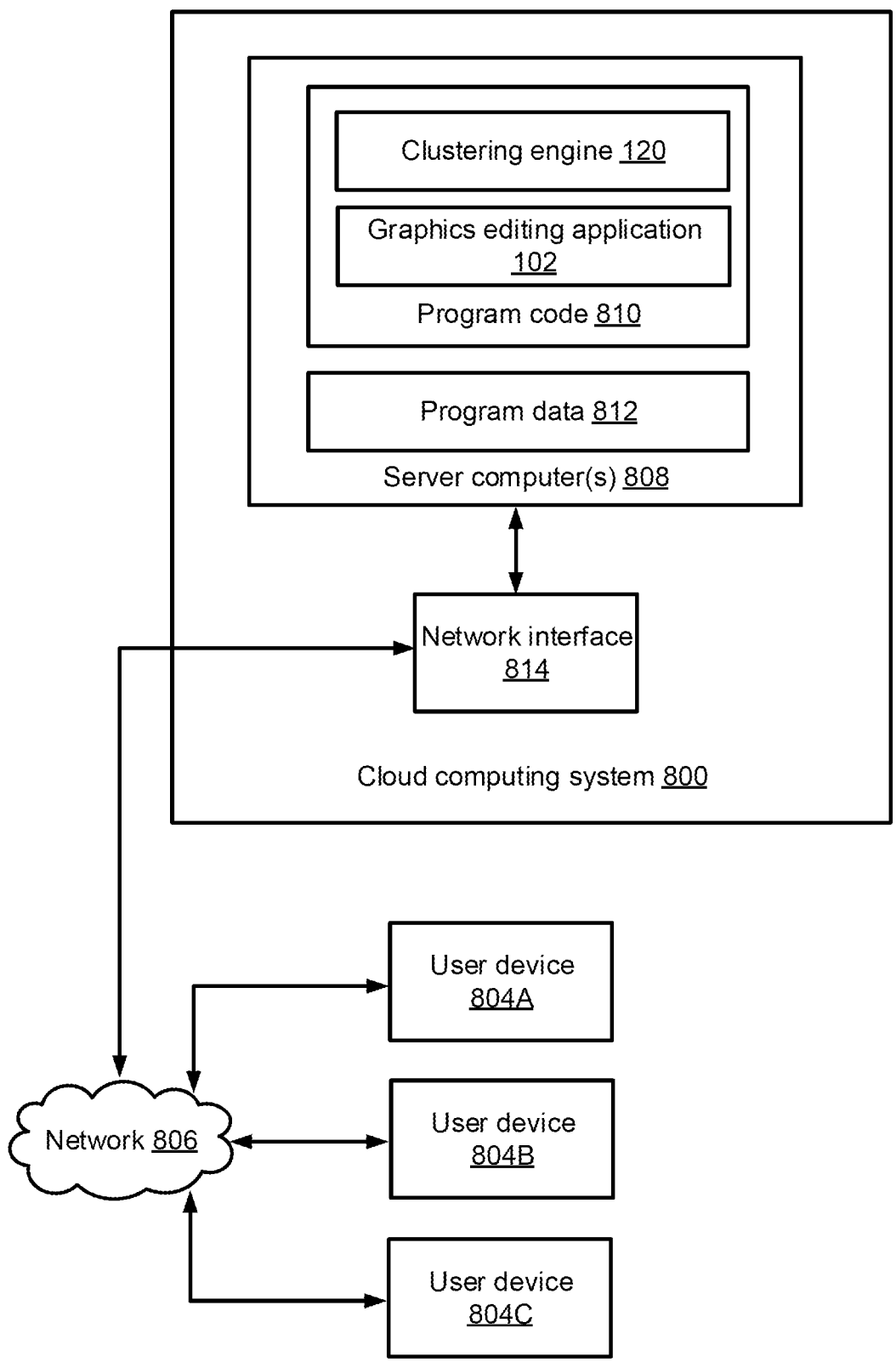
FIG. 8 depicts an example of a cloud computing system that performs certain operations described herein, according to certain embodiments described in the present disclosure.

In some embodiments, the functionality provided by computer system 700 is offered as cloud services by a cloud service provider. For example, FIG. 8 depicts an example of a cloud computer system 800 offering the clustering engine 120 and the graphics editing application 102 that is used by a number of user subscribers including user subscribers using user devices 804A, 804B, and 804C across a data network 806. In the example, the clustering engine 120 and the graphics editing application 102 is offered under a Software as a Service (SaaS) model. One or more users subscribe to a graphics editing service, and the cloud computer system 800 performs one or more functions of the clustering engine 120 and the graphics editing application 102 for subscribers. For example, the cloud computer system 800 performs services including one or more of steps or functions illustrated in FIGS. 2-4 and described herein. The cloud computer system 800 includes one or more remote server computers 808.

The remote server computers 808 include any suitable non-transitory computer-readable medium for storing program code 810 (e.g., the clustering engine 120 and/or the graphics editing application 102) and program data 812, or both, which is used by the cloud computer system 800 for providing the cloud services. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 808 include volatile memory, non-volatile memory, or a combination thereof.

One or more of the server computers 808 execute the program code 510 that configures one or more processors of the server computers 808 to perform one or more of the operations that provide one or more methods described herein (e.g., the methods of FIGS. 2-4 described herein). As depicted in the embodiment in FIG. 8, the servers implement the clustering engine 120 and the graphics editing application 102. Any other suitable systems or subsystems that perform one or more operations described herein (e.g., one or more development systems for configuring an interactive user interface) are also implemented by the cloud computer system 800.

In some embodiments, the cloud computer system 800 implements the services by executing program code and/or using program data 812, which is resident in a memory device of the server computers 808 or any suitable computer-readable medium and is executed by the processors of the server computers 808 or any other suitable processor.

In some embodiments, the program data 812 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 806. The cloud computer system 800 also includes a network interface device 814 that enable communications to and from cloud computer system 800. In some embodiments, the network interface device 814 includes any device or group of devices suitable for establishing a wired or wireless data connection to the data networks 806.

Non-limiting examples of the network interface device 814 include an Ethernet network adapter, a modem, and/or the like. The graphics editing service is able to communicate with the user devices 804A, 804B, and 804C via the data network 806 using the network interface device 814.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The examples of systems, methods, and acts described in the embodiments presented previously are illustrative, and, in alternative embodiments, certain acts can be performed in a different order, in parallel with one another, omitted entirely, and/or combined between different embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The system or systems discussed herein are not limited to any particular hardware architecture or configuration. A computing device can include any suitable arrangement of components that provide a result conditioned on one or more inputs. Suitable computing devices include multipurpose, microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices, operations comprising:
    accessing a vector design comprising a first object at a first coordinate along an axis, a second object at a second coordinate along the axis, and a third object at a third coordinate along the axis;
    assigning, using a clustering algorithm, the first object and the second object to or within a common level in an object hierarchy based on determining that:
        a similarity score comparing the first object and the second object exceeds a threshold similarity score, wherein the similarity score is determined based on attributes of the first and second objects comprising one or more of color parameters, stroke parameters, size parameters, shape parameters, and spatial placement parameters, and
        a modification causing the first coordinate and the second coordinate to be adjacent along the axis maintains an overlap between the third object and one or more of the first object and the second object;
    receiving a user input causing a selection of the first object;
    expanding the selection to the second object based on the second object being assigned to the common level in the object hierarchy;
    applying an edit to the first object and the second object based on the selection being expanded to the second object.

2. The method of claim 1, wherein the object hierarchy further comprises a first object level including the first object only, the operations further comprising:

at a time before applying the edit and after expanding the selection to the second object, receiving an additional user input selecting the first object level of the object hierarchy; and in response to receiving the additional user input, contracting the selection to the first object only based on the first object being assigned to the first object level in the object hierarchy, wherein the edit is applied to the first object only based on the selection being contracted to the first object.

3. The method of claim 1, the operations further comprising:

generating a ranked queue of similarity scores including the similarity score comparing the first object and the second object, a second similarity score comparing the first object and the third object, and a third similarity score comparing the second object and the third object, wherein the similarity score is a highest similarity score in the ranked queue, the highest similarity score indicating a greatest degree of similarity between objects associated with the highest similarity score, and wherein the assigning operation is performed further based on the similarity score being the highest score in the similarity queue.

4. The method of claim 3, the operations further comprising:

in response to the assigning the first object and the second object to or within a common level in an object hierarchy:

removing the similarity score from the ranked queue; and replacing the second similarity score and the third similarity score with a fourth similarity score comparing the common level with the third object.

5. The method of claim 3, wherein the vector design further comprises a fourth object, the operations further comprising:

determining that boundaries of the fourth object are within boundaries of the first object in the vector design;

assigning the first object and the fourth object to a containment group within the object hierarchy defined by the boundaries of the first object.

6. The method of claim 5, wherein the vector design further comprises a fifth object, the operations further comprising:

further assigning the fifth object to the containment group defined by the boundaries of the first object based on determining that boundaries of the fifth object are within the boundaries of the first object;

adding a fourth similarity score comparing the fourth object to the fifth object to the ranked queue based on the fourth similarity score being greater than the threshold similarity score and based on the fourth object and the fifth object both belonging to the containment group.

7. The method of claim 5, the operations further comprising:

not adding a fourth similarity score comparing the third object to the fourth object in response based on determining that the fourth object belongs to the containment group and the third object does not belong to the containment group.

8. The method of claim 1, wherein color comprises color space value, wherein stroke comprises one or more of stroke-width, line-cap, line-join, dash-array, and stroke color, wherein size is an area within an object, and wherein spatial placement comprises a shortest distance between objects.

9. A non-transitory computer-readable medium comprising computer-readable program instructions that, when executed by a computing device, cause the computing device to:

access a vector design comprising a first object and a second object;

assign the first object to a first level in an object hierarchy;

assign the second object to a second level in the object hierarchy, wherein the first level is a sub-level of the second level, wherein the second object is assigned to the second level based on a modification causing a distance between the first and second objects along an axis to be modified maintains an overlap between a third object and one or more of the first object and the second object;

receive a first input causing a selection of the first object;

receive a second input indicating a navigation from the first level to the second level within the object hierarchy;

apply, based on the navigation, the selection to the second object.

10. The non-transitory, computer-readable medium of claim 9, further comprising computer-readable instructions that when executed by the computing device, further cause the computing device to:

receive, at a time after expanding the selection to the second object, an additional user input selecting the first object level of the object hierarchy; and contract, in response to receiving the additional user input, the selection to the first object only based on the first object being assigned to the first object level in the object hierarchy.

11. The non-transitory, computer-readable medium of claim 9, further comprising computer-readable instructions that when executed by the computing device, further cause the computing device to:

generate a ranked queue of similarity scores including the similarity score comparing the first object and the second object, a second similarity score comparing the first object and the third object, and a third similarity score comparing the second object and the third object, wherein the similarity score is a highest similarity score in the ranked queue, the highest similarity score indicating a greatest degree of similarity between objects associated with the highest similarity score, and wherein the assigning operation is performed further based on the similarity score being the highest score in the similarity queue.

12. The non-transitory, computer-readable medium of claim 11, further comprising computer-readable instructions that when executed by the computing device, further cause the computing device to:

in response to the assigning the first object and the second object to or within a common level in an object hierarchy:

remove the similarity score from the ranked queue; and replace the second similarity score and the third similarity score with a fourth similarity score comparing the common level with the third object.

13. The non-transitory, computer-readable medium of claim 11, wherein the vector design further comprises a fourth object, and wherein the non-transitory, computer-readable medium further comprises computer-readable instructions that when executed by the computing device, further cause the computing device to:
  determine that boundaries of the fourth object are within boundaries of the first object in the vector design;
  assign the first object and the fourth object to a containment group within the object hierarchy defined by the boundaries of the first object.

14. The non-transitory, computer-readable medium of claim 13, wherein the vector design further comprises a fifth object, and wherein the non-transitory, computer-readable medium further comprises computer-readable instructions that when executed by the computing device, further cause the computing device to:
  assign the fifth object to the containment group defined by the boundaries of the first object based on determining that boundaries of the fifth object are within the boundaries of the first object;
  add a fourth similarity score comparing the fourth object to the fifth object to the ranked queue based on the fourth similarity score being greater than a threshold similarity score and based on the fourth object and the fifth object both belonging to the containment group.

15. A system, comprising:
  means for accessing a vector design comprising a first object and a second object;
  means for assigning the first object to a first level in an object hierarchy;
  means for assigning the second object to a second level in the object hierarchy, wherein the first level is a sub-level of the second level, wherein the second object is assigned to the second level based on a modification causing a distance between the first and second objects along an axis to be modified maintains an overlap between a third object and one or more of the first object and the second object;
  means for receiving a first input causing a selection of the first object;
  means for receiving a second input indicating a navigation from the first level to the second level within the object hierarchy;
  means for applying, based on the navigation, the selection to the second object.

16. The system of claim 15, further comprising:
  means for receiving, at a time after expanding the selection to the second object, an additional user input selecting the first object level of the object hierarchy; and
  means for contracting, in response to receiving the additional user input, the selection to the first object only based on the first object being assigned to the first object level in the object hierarchy.

17. The system of claim 15, further comprising:
  means for generating a ranked queue of similarity scores including the similarity score comparing the first object and the second object, a second similarity score comparing the first object and the third object, and a third similarity score comparing the second object and the third object,
  wherein the similarity score is a highest similarity score in the ranked queue, the highest similarity score indicating a greatest degree of similarity between objects associated with the highest similarity score, and
  wherein the assigning operation is performed further based on the similarity score being the highest score in the similarity queue.

18. The system of claim 17, further comprising means for:
  in response to the assigning the first object and the second object to or within a common level in an object hierarchy:
    removing the similarity score from the ranked queue; and
    replacing the second similarity score and the third similarity score with a fourth similarity score comparing the common level with the third object.

19. The system of claim 17, further comprising:
  means for determining that boundaries of a fourth object are within boundaries of the first object in the vector design;
  means for assigning the first object and the fourth object to a containment group within the object hierarchy defined by the boundaries of the first object.

20. The system of claim 19, further comprising:
  means for assigning a fifth object to the containment group defined by the boundaries of the first object based on determining that boundaries of the fifth object are within the boundaries of the first object; and
  means for adding a fourth similarity score comparing the fourth object to the fifth object to the ranked queue based on the fourth similarity score being greater than a threshold similarity score and based on the fourth object and the fifth object both belonging to the containment group.

* * * * *